(12) United States Patent
Chu et al.

(10) Patent No.: US 12,413,990 B2
(45) Date of Patent: Sep. 9, 2025

(54) DETERMINING AN ACTIVITY ASSOCIATED WITH A MOBILE DEVICE BASED ON A LOW-LEVEL INFORMATION REPRESENTING THE ACTIVITY

(71) Applicant: DISH Wireless L.L.C., Englewood, CO (US)

(72) Inventors: Christine Chu, Davis, CA (US); Kalleri Faizel Rehiman, Fremont, CA (US); Madhukar Pulluru, Foster City, CA (US); Mikhail L. Arbuzov, Santa Clara, CA (US); Qi Chu, San Mateo, CA (US); Sisong Bei, Littleton, CO (US); Yongjoon Oh, Morgan Hill, CA (US)

(73) Assignee: DISH Wireless L.L.C., Englewood, CO (US)

( * ) Notice: Subject to any disclaimer, the term of this patent is extended or adjusted under 35 U.S.C. 154(b) by 439 days.

(21) Appl. No.: 18/074,433

(22) Filed: Dec. 2, 2022

(65) Prior Publication Data
US 2024/0187891 A1 Jun. 6, 2024

(51) Int. Cl.
| | |
|---|---|
| H04W 24/08 | (2009.01) |
| G06F 16/28 | (2019.01) |
| H04L 43/0811 | (2022.01) |
| H04W 8/18 | (2009.01) |

(52) U.S. Cl.
CPC .......... *H04W 24/08* (2013.01); *G06F 16/285* (2019.01); *H04L 43/0811* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 2021/0042338 A1* | 2/2021 | Smutko | G06F 11/3438 |
| 2022/0300627 A1* | 9/2022 | Diskin | G06F 16/906 |

* cited by examiner

*Primary Examiner* — Frantz Bataille
(74) *Attorney, Agent, or Firm* — Perkins Coie LLP

(57) ABSTRACT

The system obtains a first low-level information representing a first multiplicity of activities. The first low-level information includes a first log including a first multiplicity of entries representing the first activity. An entry among the first multiplicity of entries can represent various activities. The system obtains a second low-level information representing a second multiplicity of activities. The second low-level information includes a second log comprising a second multiplicity of entries. The system obtains a correspondence between the second multiplicity of activities and the second low-level information. The correspondence maps a second activity among the second multiplicity of activities to a subset of entries in the second log. The system determines that the subset of entries in the second log and a subset of entries in the first log are similar and the subset of entries in the first log indicates the second activity.

20 Claims, 16 Drawing Sheets

DETERMINING AN ACTIVITY ASSOCIATED WITH A MOBILE DEVICE BASED ON A LOW-LEVEL INFORMATION REPRESENTING THE ACTIVITY

BACKGROUND

A mobile network operator (MNO), also known as a wireless service provider, wireless carrier, cellular company, or mobile network carrier, is a provider of wireless communications services that owns or controls all the elements necessary to provide connectivity to a user equipment (UE), including radio spectrum allocation, wireless network infrastructure, back haul infrastructure, provisioning computer systems, etc. In addition, an MNO may also sell access to network services to mobile virtual network operators (MVNO). While the MNO has access to most the data associated with the UE, the MNO only provides a limited version of this data to an MVNO. Consequently, MVNO has much less insight into the UE usage patterns.

BRIEF DESCRIPTION OF THE DRAWINGS

Detailed descriptions of implementations of the present invention will be described and explained through the use of the accompanying drawings.

Figure 1:
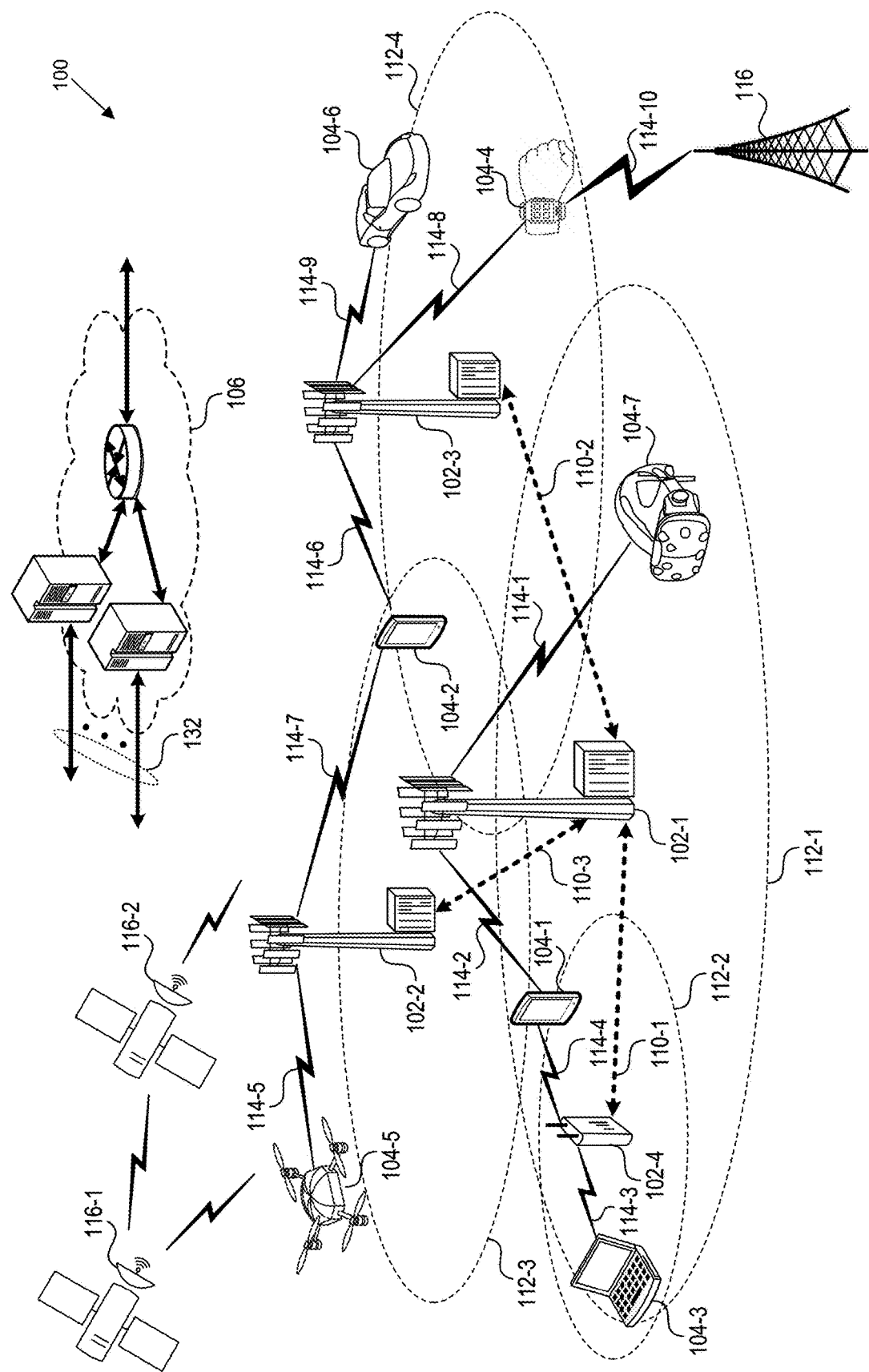
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system predicts a bandwidth usage of a mobile device operating on a wireless telecommunication network. The system obtains data associated with the mobile device, where the data represents an interaction between the mobile device and the wireless telecommunication network. The data can include: previous bandwidth usage of the mobile device, the previous call detail record of the mobile device, anticipated geolocation of the mobile device, a plan associated with the mobile device, and an identification of one or more media events.

The system obtains multiple plans of the wireless telecommunication network, where a plan indicates the bandwidth usage of the mobile device within a predetermined period. The bandwidth usage of the mobile device includes data usage of the mobile device and voice usage of the mobile device. Based on the data, the system predicts the bandwidth usage of the mobile device within the predetermined period. The system can make the prediction using artificial intelligence (AI).

The system determines the plan among the multiple plans accommodating the predicted bandwidth usage, where the plan accommodating the predicted bandwidth usage provides bandwidth usage equal to the predicted bandwidth usage or exceeding the predicted bandwidth usage by least amount compared to other plans among the multiple plans. The system requests the bandwidth usage of the plan from the wireless telecommunication network.

Further, the disclosed system creates an embedding B associated with data B representing an interaction between a mobile device B and a wireless telecommunication network B. The system obtains data A representing an interaction between a mobile device A and a wireless telecommunication network A. The data A includes at least three of: bandwidth usage associated with the mobile device, the call detail record (CDR) associated with the mobile device, geolocation associated with the mobile device, a plan associated with the mobile device, a number of lines associated with the mobile device, a length of time the mobile device has been associated with the wireless telecommunication network, a unique identifier associated with the mobile device, interconnected activity associated with the mobile device, and phone number associated with the mobile device. The data A can be obtained from a mobile network operator (MNO).

The system trains an AI to receive the data A representing the interaction between the mobile device A and the wireless telecommunication network A and to produce an output associated with the mobile device A. The AI produces an embedding A that is an encoding of the data A representing the interaction between the mobile device A and the wireless telecommunication network A. A memory footprint of the embedding A is smaller than a memory footprint of the data A. The embedding is not readable to humans and decoding the embedding into the user data is not possible without the AI or is not possible in all.

The system obtains data B representing an interaction between a mobile device B and a wireless telecommunication network B, where the data B is different from the data A, and where the second device is different from the first device. The data B includes at least three of: bandwidth usage associated with the mobile device, the CDR associated with the mobile device, geolocation associated with the mobile device, a plan associated with the mobile device, a number of lines associated with the mobile device, a length of time the mobile device has been associated with the wireless telecommunication network, a unique identifier associated with the mobile device, interconnected activity associated with the mobile device, and phone number associated with the mobile device.

The system provides the data B to the AI, where the AI is configured to produce an embedding B that is an encoding of the data B representing the interaction between the mobile device B and the wireless telecommunication network B. The system obtains the embedding B from the AI.

Additionally, the disclosed system determines an activity associated with a mobile device among multiple mobile devices based on a low-level information representing the activity. The system obtains low-level information A representing activities A associated with mobile devices A, where the activity A represents an interaction between a mobile device among the mobile devices A and a wireless telecommunication network. The low-level information A includes a log A including entries A associated with the activity A. An entry among the entries A can be associated with various activities. The log is generated by a computer, entails detailed records of the activity, and can be a CDR. Neither the system nor a person can determine the activity based on the log entries. Consequently, the activity associated with the mobile device is not known.

The system creates multiple clusters based on the low-level information A representing the activities A, where the multiple clusters represent a grouping of the low-level information A into multiple groups. A cluster among the multiple clusters indicates a subset of entries in the log A. However, the cluster is not labeled and the activity represented by the cluster is not known.

The system obtains low-level information B representing activities B associated with mobile devices B, where low-level information B includes log B. The system obtains a correspondence between the activities B and the low-level information B, where the correspondence maps activity B among the activities B to a subset of entries in the log B. The system clusters the subset of entries in log B into the cluster among the multiple clusters. The system determines that the subset of entries in the log A belonging to the cluster indicates the activity B. The activity B can be watching a streaming service. Consequently, the system determines that all the activity in the cluster corresponds to watching the streaming service.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user lane latency. In yet another example of 6G, the network 100 can implement a converged Wi-Fi and Core architecture to increase and improve indoor coverage.

5G Core Network Functions

Figure 2:
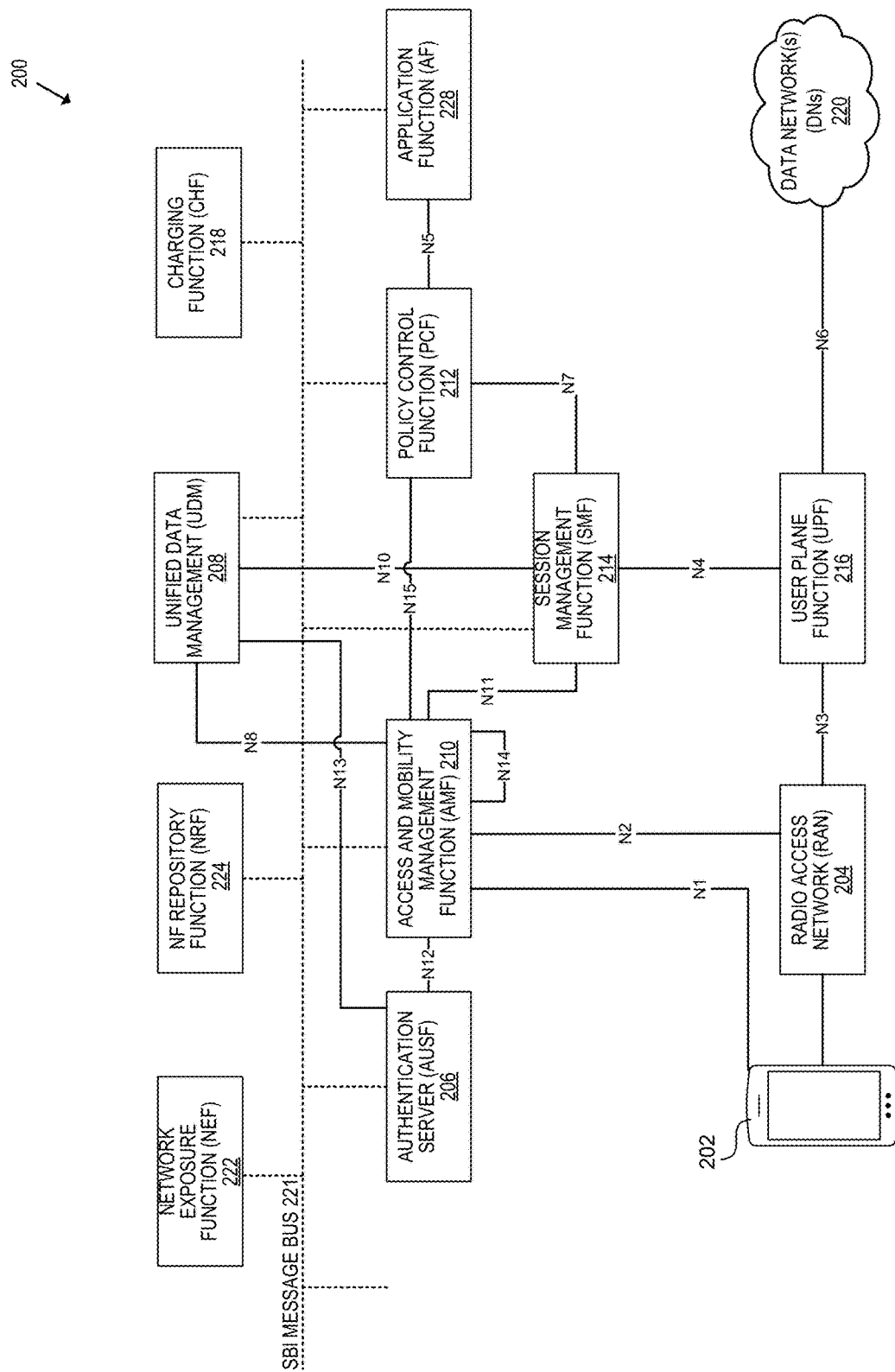
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224, a Network Slice Selection Function (NSSF), and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3rd Generation Partnership Project Technical Specification 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes network slice selection, which is regulated by the NSSF.

Figure 3A:
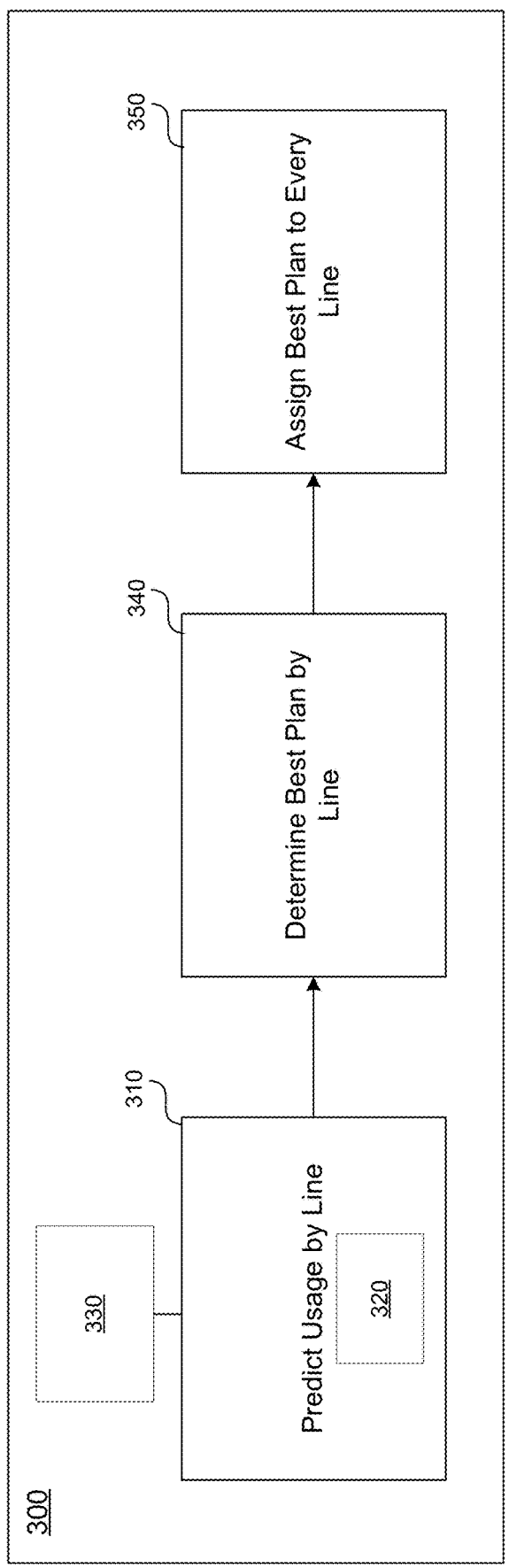
FIG. 3A shows steps to predict the bandwidth usage for each UE operating on the MVNO and, based on each individual prediction, to request the needed bandwidth usage for the MVNO.
Figure 3B:
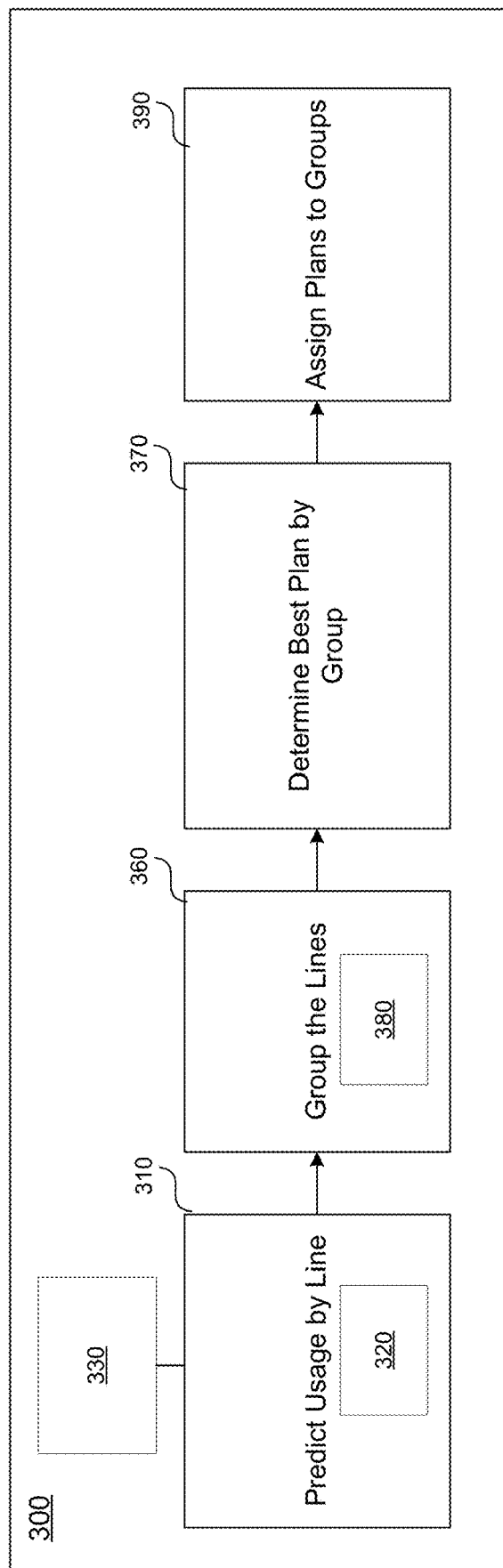
FIG. 3B shows steps to group the bandwidth usage for multiple UEs operating on the MVNO and, based on the bandwidth needed by the groups, to request the needed bandwidth usage for the MVNO.

Predicting a Bandwidth Usage Associated with a Mobile Device Operating on a Wireless Telecommunication Network FIGS. 3A-3B show steps performed by a system configured to predict and request a bandwidth usage associated with a mobile device operating on a wireless telecommunication network. The network 100 in FIG. 1 can be a mobile network operator (MNO) and can provide voice and data to a UE according to a set of predetermined plans where a plan among the set of predetermined plans indicates the bandwidth usage associated with the UE within a predetermined period, such as a month or a year. The bandwidth usage includes data usage associated with the UE within the predetermined period and voice usage associated with the UE within the predetermined period.

Alternatively, the network 100 can provide the hardware to a Mobile Virtual Network Operator (MVNO) 300. MVNO 300 does not own a mobile spectrum license but sells mobile services under its brand name using the network 100 of a licensed mobile operator. Consequently, the MVNO 300 needs to predict bandwidth usage of the UEs operating on the MVNO 300 and request the needed bandwidth usage from the MNO, e.g., the network 100.

FIG. 3A shows steps to predict the bandwidth usage for each UE operating on the MVNO 300, and based on each individual prediction, to request the needed bandwidth usage for the MVNO 300. The MVNO 300 can gather information 330 about the UE such as previous bandwidth usage associated with the mobile device, the previous CDR associated with the mobile device, anticipated geolocation associated with the mobile device, a plan associated with the mobile device, an identification of one or more media events, the plan associated with the UE, number of lines associated with the UE, payment history associated with the UE, a length of time the UE operating with the MVNO 300, a unique identifier associated with the UE, such as International Mobile Equipment Identity, a phone number associated with the UE, time of last payment, billing cycle associated with the UE, etc.

The CDR is the detailed record of all the telephonic calls that pass through the network 100. The CDR contains details such as time of the call, duration of the call, source and destination number, completion status of the call, uplink (UL) bandwidth consumed during the call, downlink (DL) bandwidth consumed during the call, cell tower(s) connecting the call, closure of the call such as whether the closure was abrupt or routine, record of thinking between the UE and cell tower(s), etc.

In step 310, the MVNO 300 can predict bandwidth usage associated with the UE over a predetermined period of time based on the information 330 associated with the UE. The predetermined period of time can be a billing cycle such as a month or a year. To make the prediction, the MVNO 300 can use an AI 320 trained to predict the bandwidth usage.

The MVNO 300 can train the AI 320 based on the information gathered from multiple UEs operating on the network 100. To train the AI 320, the MVNO 300 can perform feature extraction from the information gathered from the multiple UEs to obtain hundreds of features associated with a UE among the multiple UEs, including: average, median, mode bandwidth usage during a weekday; average, median, mode bandwidth usage during a weekend; geolocation; operating system; amount of text messages sent; amount of voice calls; call duration; time of day associated with the call; UE type; UE operating system version; etc.

The MVNO 300 can gather multiple plans offered by the network 100. In step 340, the MVNO 300 can determine the best plan among the multiple payment plans to accommodate the predicted bandwidth usage. The best plan can be equal to or exceed the predicted bandwidth usage by the least amount compared to the other plans among the multiple plans. In addition, the AI 320 can predict a needed buffer associated with the predicted bandwidth. For example, the AI 320 can indicate a confidence associated with the predicted bandwidth. If the confidence associated with the predicted bandwidth is below a predetermined threshold, such as 90%, the MVNO 300 can disregard the predicted bandwidth, and attempt another prediction. Alternatively, the MVNO 300 can revise the predicted bandwidth usage to increase the predicted bandwidth usage based on the confidence associated with the predicted bandwidth. In another embodiment, the AI 320 or a different AI can predict a buffer associated with the predicted bandwidth, which indicates by how much the predicted bandwidth can vary within the predetermined period based on anticipated new subscribers, news events, time of year, etc. Based on the buffer, the MVNO 300 can increase the predicted bandwidth.

In step 350, the MVNO 300 can assign the best plan to every UE associated with the MVNO. The MVNO 300 can also aggregate all the plans assigned to every UE associated with the MVNO, compute the total predicted bandwidth usage associated with all the UEs operating on the MVNO, and request the total predicted bandwidth usage from the network 100.

FIG. 3B shows steps to group the bandwidth usage for multiple UEs operating on the MVNO 300 and, based on the bandwidth needed by the groups, to request the needed bandwidth usage for the MVNO 300. Once the MVNO 300, in step 310, predicts bandwidth usage associated with each UE operating on the MVNO, the MVNO can, in step 360, separate the multiple predicted bandwidth usage into multiple groups 380 (only one shown). In step 370, the MVNO 300 can allocate the best plan to a group.

For example, the unlimited plan that the MNO offers can provide 35 GB of bandwidth usage. The MVNO 300 can group a subset of the multiple predicted bandwidth usage into multiple groups whose predicted bandwidth usage is approximately 35 GB. For example, a first UE can use 17 GB per month, a second UE can use 10 GB per month, and the third UE can use three GB per month. The MNO can provide multiple plans such as 15 GB per month, 25 GB per month and unlimited bandwidth usage which provides 35 GB per month. According to steps shown in FIG. 3A, the MVNO 300 can assign the 25-GB-per-month plans to the first UE, and the 15-GB-per-month plans to the second and third UE. However, in this allocation, 25 GB of bandwidth usage go unused. Grouping the first UE, the second UE and the third UE into one group 380 creates the total predicted bandwidth usage for the group of 35 gigabytes. Consequently, the MVNO 300 can, in step 370, allocate the 35 GB unlimited data plan to the group 380.

In step 390, the MVNO 300 can assign the appropriate plan to each group. For example, the total predicted bandwidth usage for all the UE is associated with the MVNO 300 can be 374 GB. Consequently, the MVNO 300 can create 10 groups each associated with the 35 GB unlimited data plan and one last group needing a total of 24 GB. The last group can be associated with the 25 GB plan.

Figure 4:
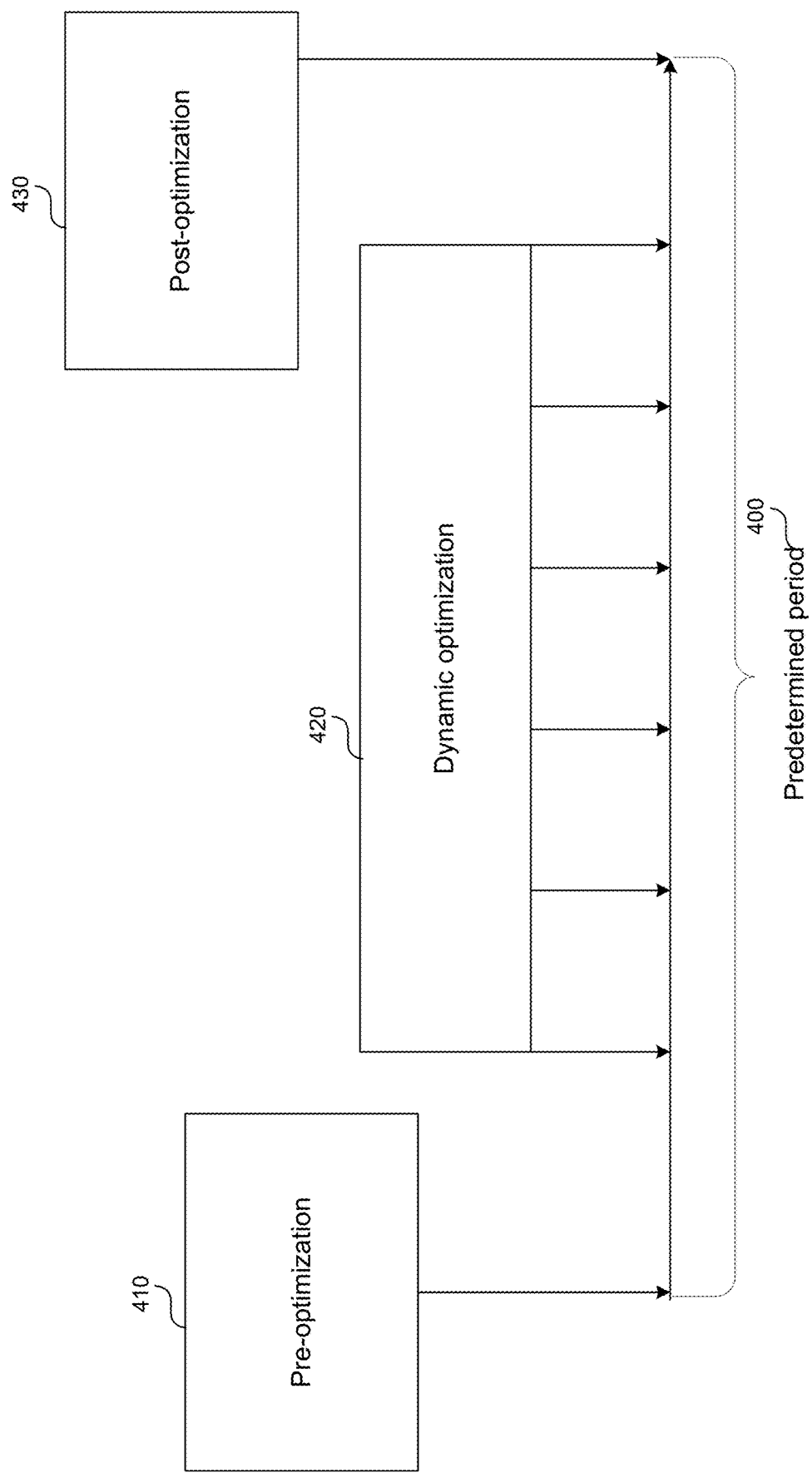
FIG. 4 shows various ways in which the MVNO can predict the bandwidth usage.

FIG. 4 shows various ways in which the MVNO 300 in FIGS. 3A-3B can predict the bandwidth usage. In one embodiment, the MVNO 300 can predict the bandwidth usage of a UE at the beginning 410 of the predetermined period 400, such as at the beginning of the month. For example, the MVNO 300 can predict anticipated geolocation associated with the UE for the whole predetermined period 400, and generate the predicted bandwidth usage, as described in this application.

In another embodiment, in step 420, the MVNO 300 can dynamically adjust the predicted bandwidth usage as the predetermined period 400 unfolds and the actual bandwidth usage differs from the predicted bandwidth usage. For example, the MVNO 300 can determine that the actual bandwidth usage is lower or higher than the predicted bandwidth usage and can adjust the predicted bandwidth usage to be the prorated actual bandwidth usage for the remainder of the predetermined period 400. Alternatively, the geolocation of the UE can unexpectedly change, for example, because the user is traveling away from home. Consequently, the MVNO 300 can increase the predicted bandwidth usage to accommodate expected frequent calls to home.

In a third embodiment, the MVNO 300, at the end 430 of the predetermined period 400, can determine how well the predicted usage match the actual usage associated with the UE. Based on the actual usage, the MVNO 300 can retrain the AI 320 in FIGS. 3A-3B to improve accuracy of the next prediction.

Figure 5:
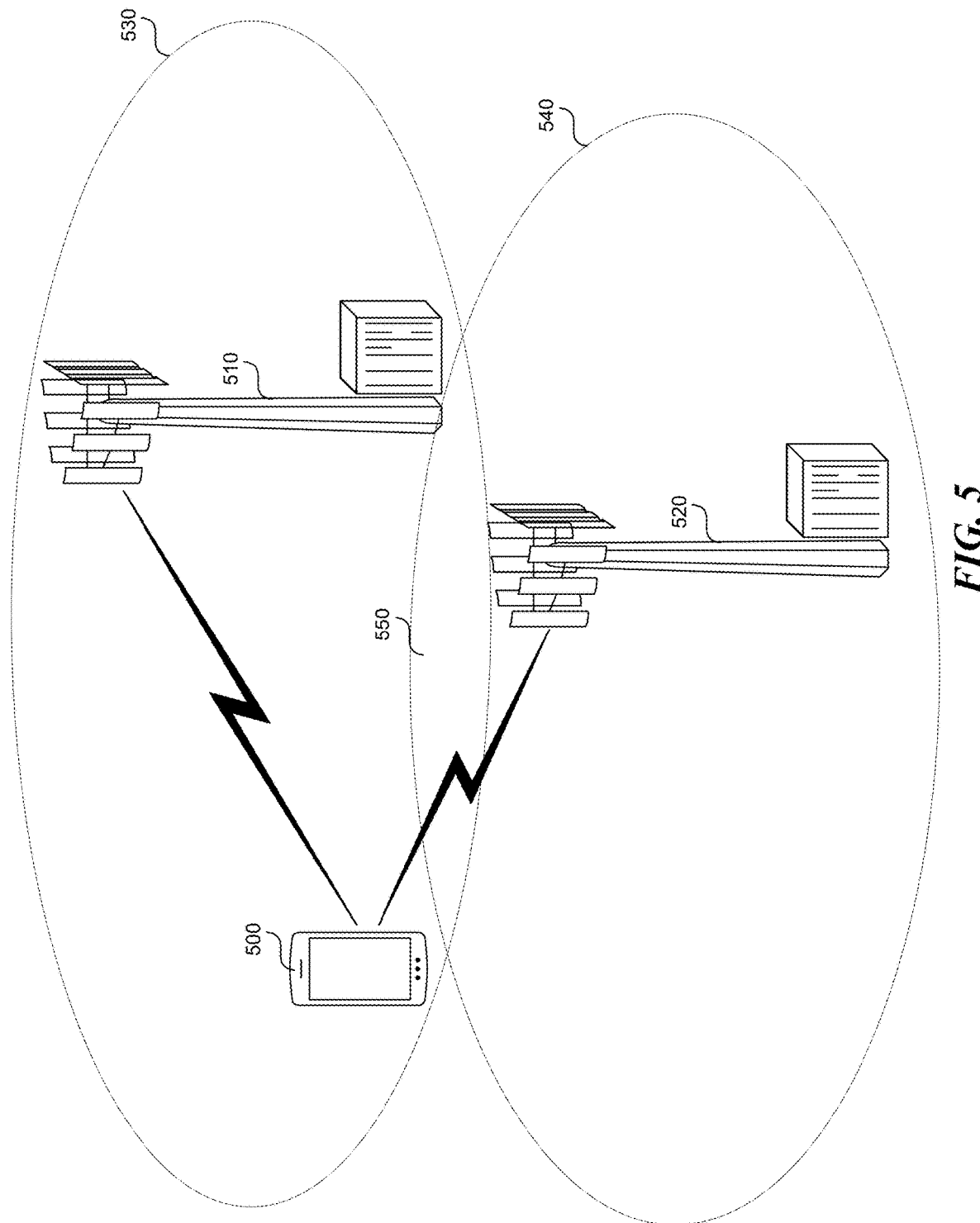
FIG. 5 shows two wireless telecommunication networks.

FIG. 5 shows two wireless telecommunication networks. The UE 500 can be served by two wireless telecommunication networks ("networks") 510, 520. The networks 510, 520 can be structured like the network 100 in FIG. 1. The network 510 can be considered the home network, while the network 520 can be the roaming network. The network 510 can serve area 530, while the network 520 can serve the area 540. The area 530 and the area 540 can overlap in the region 550.

The MVNO 300 in FIGS. 3A-3B may want to increase and/or maximize the amount of service provided to the UE by the network 520. In other words, the MVNO 300 may want to maximize the roaming of the UE 500 on the network 520 because the network 520 is operated by the MVNO 300, while the network 510 is operated by the MNO. Consequently, when the UE is in the overlap region 550, the UE is served by the network 520.

To predict bandwidth usage of the UE 500 when the UE can be served by both networks 510, 520, the MVNO 300 can obtain a predicted geolocation of the UE during the predetermined period and determine how frequently the UE 500 is in an area served only by the network 510. The MVNO 300 can generate the predicted bandwidth usage based on how frequently the UE 500 is in an area served only by the network 510. For example, if the UE 500 is predicted to not be in the area served only by the network 510, the predicted bandwidth usage can be 0. If the UE is predicted to frequently be in the area served only by the network 510, the predicted bandwidth usage can increase, while if the UE is less frequently in the area served only by the network 510, the predicted bandwidth usage can decrease.

Figure 6:
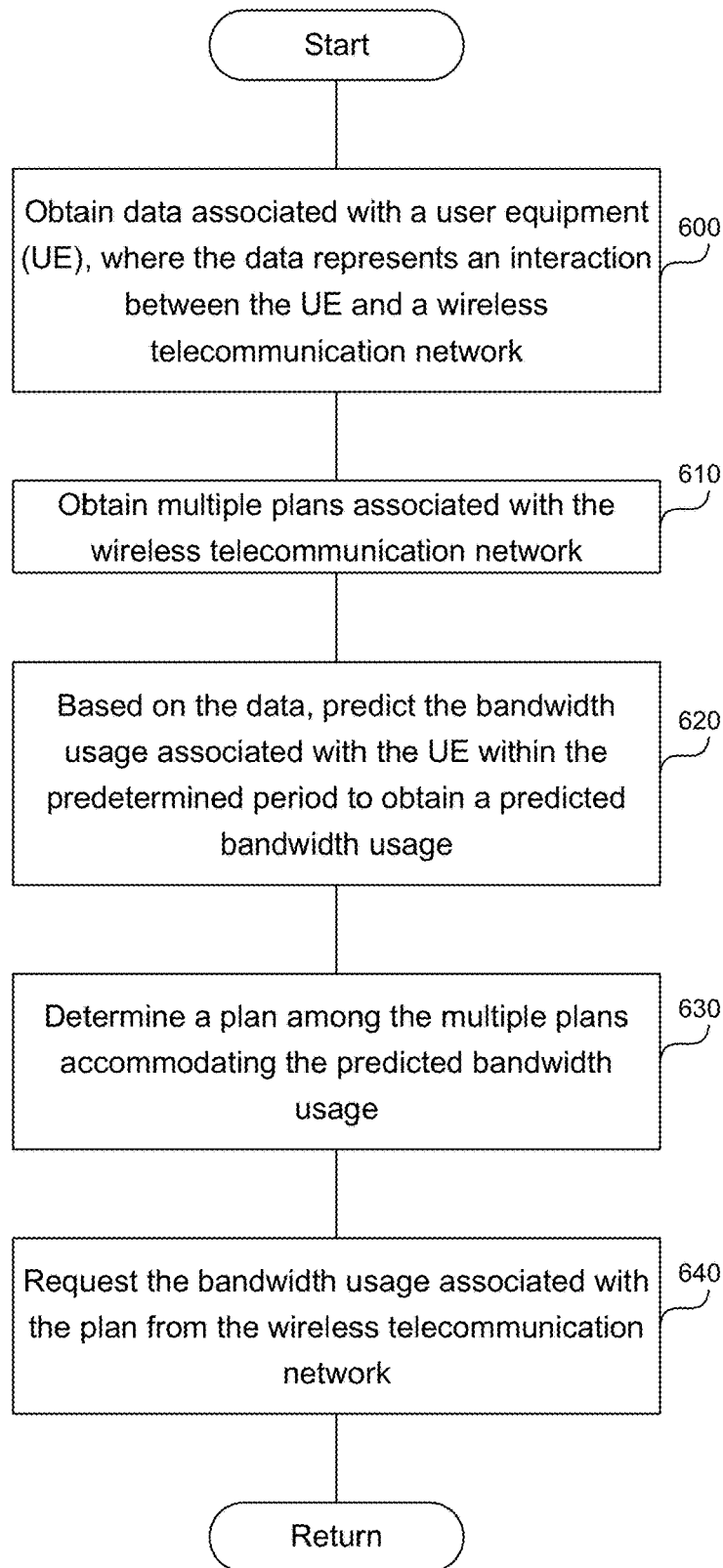
FIG. 6 is a flowchart of a method to predict a bandwidth usage associated with a mobile device operating on a wireless telecommunication network.

FIG. 6 is a flowchart of a method to predict a bandwidth usage associated with a mobile device operating on a wireless telecommunication network. In step 600, a hardware or software processor executing instructions described in this application can obtain data associated with a UE, where the data represents an interaction between the UE and a wireless telecommunication network. The data can include at least two of: previous bandwidth usage associated with the mobile device, the previous CDR associated with the mobile device, anticipated geolocation associated with the mobile device, a plan associated with the mobile device, an identification of one or more media events, a number of lines associated with the UE, a length of time the UE has been associated with the wireless telecommunication network, and a unique identifier associated with the UE. The processor can predict the anticipated geolocation within the predetermined period, such as within the next month.

In step 610, the processor can obtain multiple plans associated with the wireless telecommunication network, where a plan among the multiple plans indicates the bandwidth usage associated with the UE within a predetermined period. The bandwidth usage includes data usage associated with the UE and voice usage associated with the UE.

In step 620, based on the data, the processor can predict the bandwidth usage associated with the UE within the predetermined period to obtain a predicted bandwidth usage. The processor can make the prediction using AI.

In step 630, the processor can determine the plan among the multiple plans accommodating the predicted bandwidth usage, where the plan accommodating the predicted bandwidth usage provides bandwidth usage equal to the predicted bandwidth usage or exceeding the predicted bandwidth usage by least amount compared to other plans among the multiple plans.

In step 640 the processor can request the bandwidth usage associated with the plan from the wireless telecommunication network.

Before assigning a plan to a UE, the processor can group the UEs operating on the network into one or more groups. The processor can obtain multiple data associated with multiple UEs including the UE, where first data among multiple data represents interaction between a first UE and the wireless telecommunication network. The first data can include at least two of: previous bandwidth usage associated with the UE, the previous call detail record associated with the UE, anticipated geolocation associated with the UE, a plan associated with the UE, and an identification of one or more media events. Based on the multiple data, the processor can predict multiple bandwidth usage associated with the multiple UEs within the predetermined period to obtain multiple predicted bandwidth usage. The processor can determine a plan among the multiple plans offering a greatest bandwidth usage compared to rest of multiple plans. The processor can determine a total predicted bandwidth usage by summing the multiple predicted bandwidth usage. The processor can determine a number of plans offering the greatest bandwidth usage needed to exceed the total predicted bandwidth usage. The number of plans can be 0 or bigger. For example, if the total predicted bandwidth usage is 20 GB, while the greatest bandwidth usage is 50 GB, the processor can determine that no such plans are needed.

The processor can determine a remaining bandwidth usage by computing a difference based on the total predicted bandwidth usage and the number of plans offering the greatest bandwidth usage. For example, the processor can determine that:

> remaining bandwidth usage=total predicted bandwidth usage−(number of plans offering the greatest bandwidth usage−1)*greatest bandwidth usage.

The remaining bandwidth usage can be equal to or greater than zero and less than the greatest bandwidth usage.

The processor can determine a second plan among the multiple plans accommodating the remaining bandwidth usage, where the plan accommodating the remaining bandwidth usage provides bandwidth usage equal to the remaining bandwidth usage or exceeding the remaining bandwidth usage by the least amount compared to other plans among the multiple plans. The processor can request a bandwidth usage from the wireless telecommunication network based on a second bandwidth usage associated with the second plan and the number of plans offering the greatest bandwidth usage. For example, the processor can request bandwidth usage such that:

> requested bandwidth usage=(number of plans offering greatest bandwidth usage−1) greatest bandwidth usage+second bandwidth usage.

Alternatively, the processor can request a new plan from the network that provides the total predicted bandwidth usage.

To group the UEs, the processor can obtain multiple data associated with multiple UEs including the UE, where first data among multiple data represents an interaction between a first UE and the wireless telecommunication network. The first data can include at least two of: previous bandwidth usage associated with the mobile device, the previous CDR associated with the mobile device, anticipated geolocation associated with the mobile device, a plan associated with the mobile device, an identification of one or more media events, a number of lines associated with the UE, a length of time the UE operating with the wireless telecommunication network, and a unique identifier associated with the UE. Based on the multiple data, the processor can predict multiple bandwidth usage associated with the multiple UEs within the predetermined period to obtain multiple predicted bandwidth usage. The processor can group the multiple predicted bandwidth usage into a group, where a predicted bandwidth usage associated with the group indicates a sum of the multiple predicted bandwidth usage included in the group. The processor can determine one or more plans plan among the multiple plans accommodating the predicted bandwidth usage, where the plan accommodating the predicted bandwidth usage provides bandwidth usage equal to the predicted bandwidth usage or exceeding the predicted bandwidth usage by least amount compared to other plans among the multiple plans. The processor can request a bandwidth usage associated with the one or more plans from the wireless telecommunication network.

The processor can perform feature extraction from the data to train an AI. The processor can obtain multiple data associated with multiple UEs. The processor can extract multiple features from the multiple data, where multiple features include at least two of: geographic location associated with a first UE among the multiple UEs, voice data usage associated with the first UE among the multiple UEs, text message usage associated with the first UE among the multiple UEs, data usage associated with the first UE among the multiple UEs, duration of a call associated with the first UE among the multiple UEs, operating system associated with the first UE among the multiple UEs, average daily usage during weekdays associated with the first UE among the multiple UEs, and average daily usage during weekends associated with the first UE among the multiple UEs. The processor can train the AI using the multiple features, thereby configuring the artificial intelligence to predict the bandwidth usage associated with the UE.

The processor can use feature extraction to provide data to the AI in production. The processor can extract multiple features from the data, where multiple features include at least two of: geographic location associated with the UE, voice data usage associated with the UE, text message usage associated with the UE, data usage associated with the UE, duration of a call associated with the UE, operating system associated with the UE, average daily usage during weekdays associated with the UE, and average daily usage during weekends associated with the UE. The processor can provide the multiple features to an AI configured to predict the bandwidth usage associated with the UE to obtain the predicted bandwidth usage.

When the UE has a choice of connectivity through two different networks, the processor can increase connectivity to the second wireless telecommunication network. The processor can determine a first geolocation served by a first wireless telecommunication network. The processor can determine a second geolocation served by a second wireless telecommunication network, where the first geolocation and the second geolocation overlap in an overlap region. When the UE is in the overlap region, the processor can cause the UE to receive connectivity from the second wireless telecommunication network. The processor can predict a geolocation associated with the UE within the predetermined period. Based on the geolocation associated with the UE, the overlap region, and the first geolocation, the processor can predict the bandwidth usage associated with the UE within the predetermined period to obtain the predicted bandwidth usage, where the predicted bandwidth usage associated with the UE is provided by the first wireless telecommunication network and excludes the bandwidth usage provided by the second wireless telecommunication network The processor can provide a confidence level associated with the predicted bandwidth usage. The processor can determine whether the confidence level associated with the predicted bandwidth usage is above a predetermined threshold, such as 90%. Upon determining that the confidence level associated with the predicted bandwidth usage is below the predetermined threshold, the processor can revise, e.g., reevaluate, the predicted bandwidth usage. When revising the bandwidth usage, the processor can discard the predicted bandwidth usage and make another prediction. Alternatively, the processor can adjust the predicted bandwidth usage, up or down, based on the confidence.

The processor can dynamically adjust the predicted bandwidth usage in the middle of the predetermined period. The processor can monitor the bandwidth usage associated with the UE during at least a portion of the predetermined period, such as the first quarter, first third, or first half of the predetermined period. Based on the monitored bandwidth usage, the processor can determine whether the predicted bandwidth usage needs to be adjusted.

For example, the processor can calculate daily or hourly rate of bandwidth usage during the monitored period and can make a second predicted bandwidth usage based on the calculated rate. If the second predicted bandwidth usage significantly differs from the predicted bandwidth usage, such as by more than 30%, the processor can adjust the predicted bandwidth usage to match the second predicted bandwidth usage.

In another example, the predicted geolocation of the UE can differ significantly from the actual geolocation of the UE during the monitored period, e.g., because the UE is unexpectedly traveling. Alternatively, there can be unexpected events in the news. Consequently, the processor can make a second prediction of the bandwidth usage using the actual geolocation information and the updated events in the news. Upon determining that the predicted bandwidth usage needs to be adjusted, the processor can generate a second predicted bandwidth usage associated with the UE. The processor can determine a second plan among the multiple plans accommodating the second predicted bandwidth usage, where the second plan accommodating the second predicted bandwidth usage provides bandwidth usage equal to the second predicted bandwidth usage or exceeding the second predicted bandwidth usage by least amount compared to other plans among the multiple plans. The processor can request a bandwidth usage associated with the second plan from the wireless telecommunication network.

Figure 7:
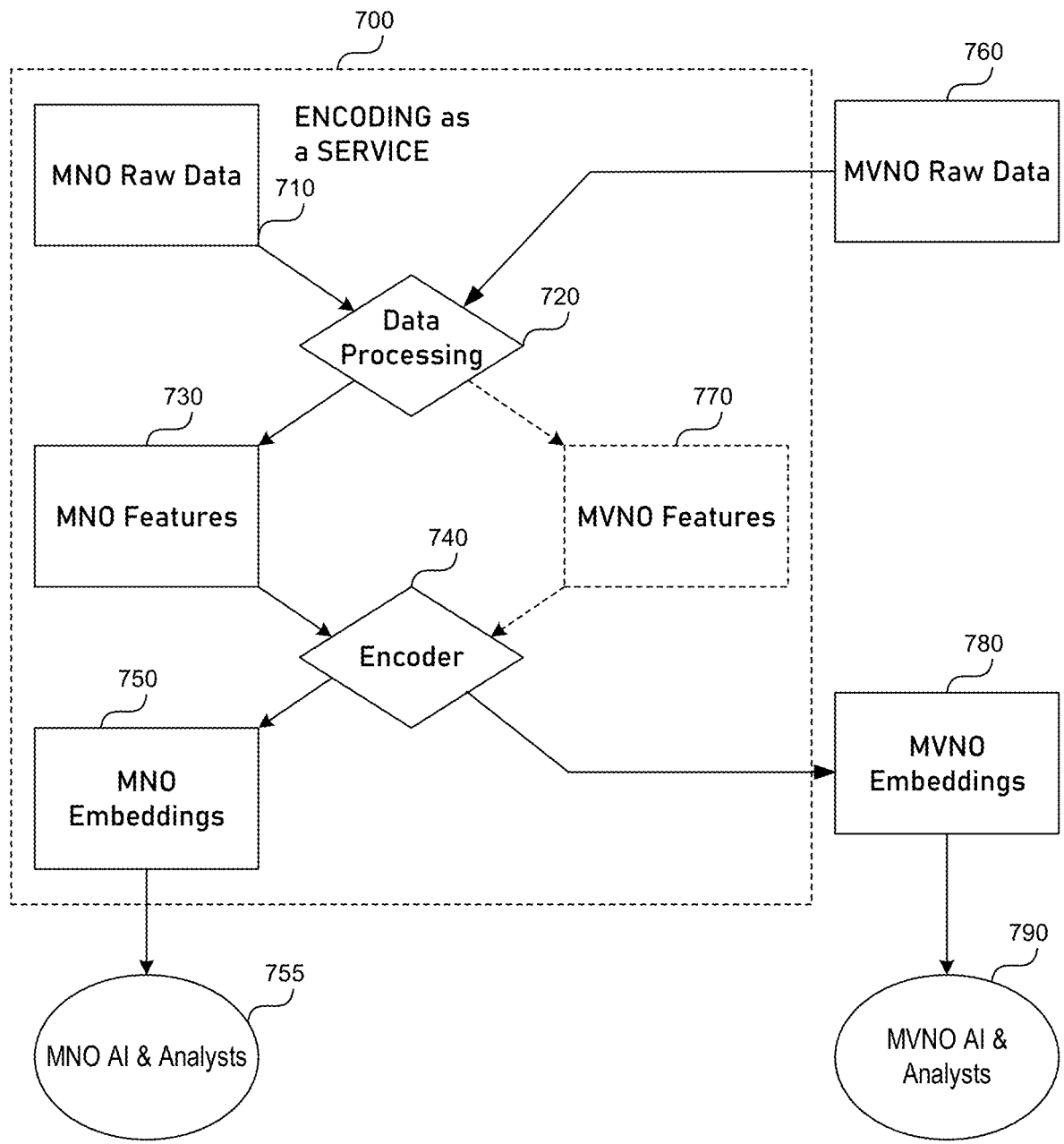
FIG. 7 shows a system to provide the embedding, or an encoding, as a service.

Creating an Embedding Associated With a Data Representing an Interaction Between a Mobile Device and a Wireless Telecommunication Network FIG. 7 shows a system to provide the embedding, or an encoding, as a service. The system 700 can obtain raw data 710 from a first source such as a first wireless telecommunication network, acting as an MNO. The raw data 710 can include sensitive personal data of the user associated with the first wireless telecommunication network. The raw data 710 can include phone numbers called, the frequency, duration, and timing of such calls, and any services purchased by the consumer, such as call waiting. Further, the raw data 710 can include bandwidth usage associated with the mobile device, the CDR associated with the mobile device, geolocation associated with the mobile device, a plan associated with the mobile device, a number of lines associated with the mobile device, a length of time the mobile device has been associated with the wireless telecommunication network, a unique identifier associated with the mobile device, interconnected activity associated with the mobile device, phone number associated with the mobile device, a home location associated with the mobile device, work location associated with the mobile device, weekend location associated with the mobile device, and details on how often the mobile device travels and where.

In step 720, the system 700 can perform feature extraction or data processing to convert the raw data 710 into multiple features 730, including geographic location associated with the mobile device, location of home, location of work, weekend location associated with the mobile device, how often a user of the mobile device travels and where, voice data usage associated with the mobile device, text message usage associated with the mobile device, data usage associated with the mobile device, duration of a call associated with the mobile device, mobile device operating system associated with the mobile device, average daily usage during weekdays associated with the mobile device, and average daily usage during weekends associated with the mobile device.

Figure 8:
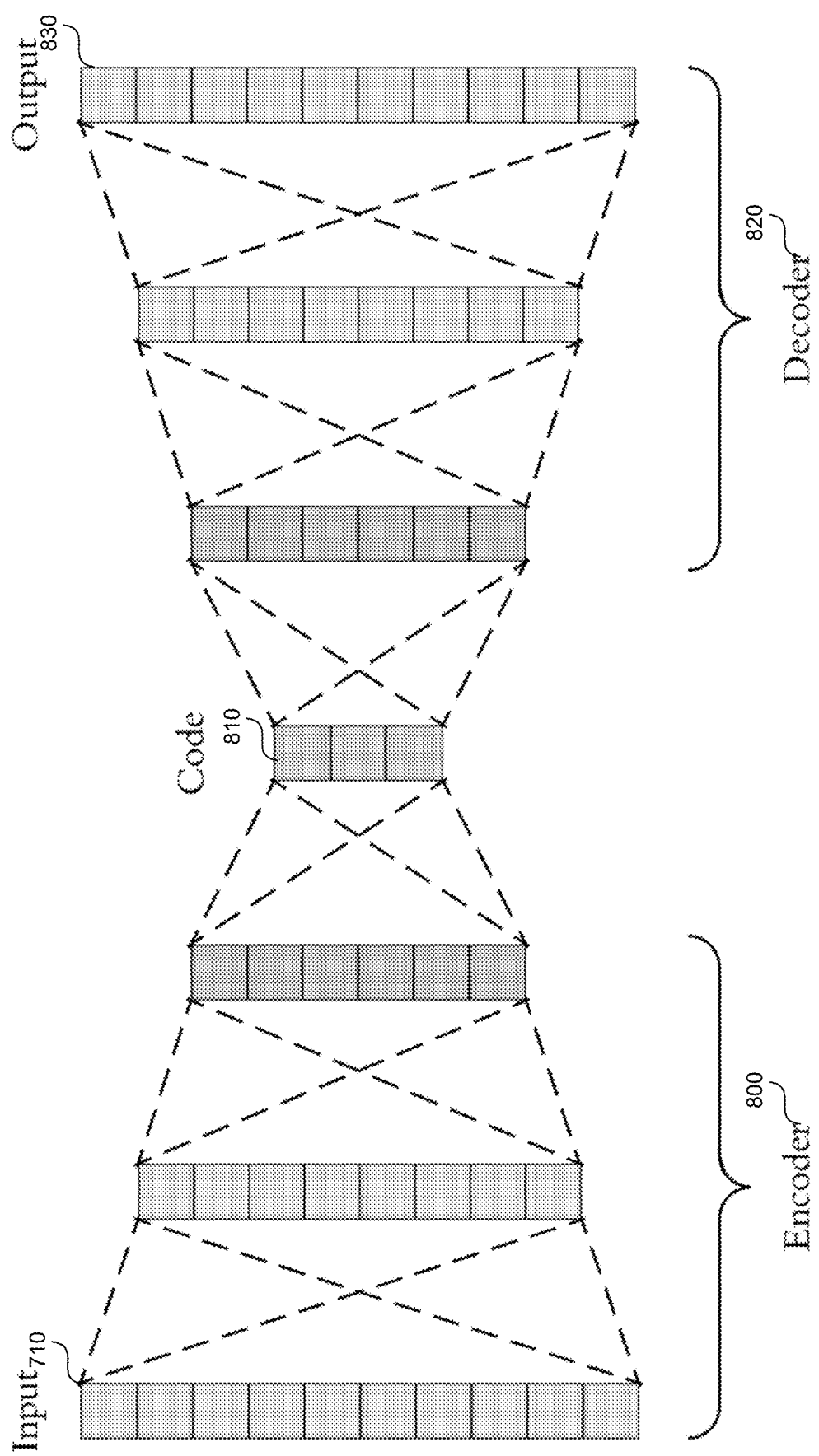
FIG. 8 shows an embedding.

The system 700 can train an AI 740 by providing the features 730 to an AI 740, e.g., an encoder, which can perform dimensionality reduction as explained in FIG. 8, to produce an embedding, e.g., an embedding vector, embedding 750. The embedding 750 has fewer dimensions than the raw data 710 and occupies less memory.

The AI 740 can be a supervised machine learning problem. As a side effect, training the AI 740 encodes the data 710 into embeddings 750. For example, the AI 740 can predict the amount of data usage associated with the mobile device based on the prior data usage. The AI 740 can factorize the input into an embedding 750 and that embedding can be used to predict the future data usage. So even though the AI is trained to solve a supervised problem, e.g., the surrogate problem of what is the predicted daily usage, the actual creation of embeddings 750 is an unsupervised process. The embedding 750 represents the data 710 in a secure format that humans cannot read. The system 700 can pass the embedding 750 to another AI 755 for further categorization, prediction, and analysis.

The system 700 can be offered as a service to a second wireless telecommunication network without disclosing the data 710, the training, the AI 740, and/or the embedding 750. The second wireless telecommunication network can be an MVNO network. The system 700 can receive raw data 760 from the second wireless telecommunication network. The raw data 760 can include the same categories as the raw data 710, such as phone numbers called, the frequency, duration, and timing of such calls, and any services purchased by the consumer, such as call waiting. Further the raw data 710 can include bandwidth usage associated with the mobile device, the CDR associated with the mobile device, geolocation associated with the mobile device, a plan associated with the mobile device, a number of lines associated with the mobile device, a length of time the mobile device has been associated with the wireless telecommunication network, a unique identifier associated with the mobile device, interconnected activity associated with the mobile device, and phone number associated with the mobile device.

The system, without disclosing the feature extraction step 720 to the second wireless telecommunication network, can extract multiple features 770 from the data 760. The system 700 can pass the multiple features 770 to the AI 740. The AI 740 can produce the embedding 780, which the system 700 can return to the second wireless telecommunication network. The second wireless telecommunication network can provide the embedding 780 as input to an AI 790. The AI 790 can be configured to predict various aspects of the behavior of the mobile device such as data usage, advertisements to show on the mobile device, promotions to show, etc.

FIG. 8 shows an embedding. The encoder 800 can be the AI 740 in FIG. 7. The encoder 800 can receive, as input, data 710 and can create an embedding 810. Embedding 810 can be the embedding 750, 780 in FIG. 7. An embedding 810 is a dense numerical representation of real-world objects and relationships, expressed as a vector. The vector space quantifies the semantic similarity between categories. Embedding vectors 810 that are close to each other are considered similar. Sometimes, they are used directly for "similar items to this" section in an e-commerce store. Other times, embeddings 810 are passed to other models 755, 790 in FIG. 7. In those cases, the model 755, 790 can share learnings across similar items rather than treating them as two completely unique categories. For this reason, embeddings 810 can be used to accurately represent sparse data like clickstreams, text, and e-commerce purchases.

As can be seen in FIG. 8, the dimensionality of the input data 710 is greater than the dimensionality of the embedding 810. For example, the input data 710 can have 10,000 dimensions, while the embedding 810 can have one hundred dimensions. In other words, the input data 710 requires more memory than the embedding 810. The encoder 800 reduces the human readable input data 710 into a vector encoding 810 that cannot be read by humans. In addition, the encoding 810 cannot be reverse engineered to produce the input data 710. A decoder 820 can take the encoding and can produce an output 830 having the same dimensionality as the input data 710. However, the output 830 is not the same as the input data 710. Consequently, the embedding 810 can be a way to encode sensitive information about the user in a non-human readable way.

Figure 9:
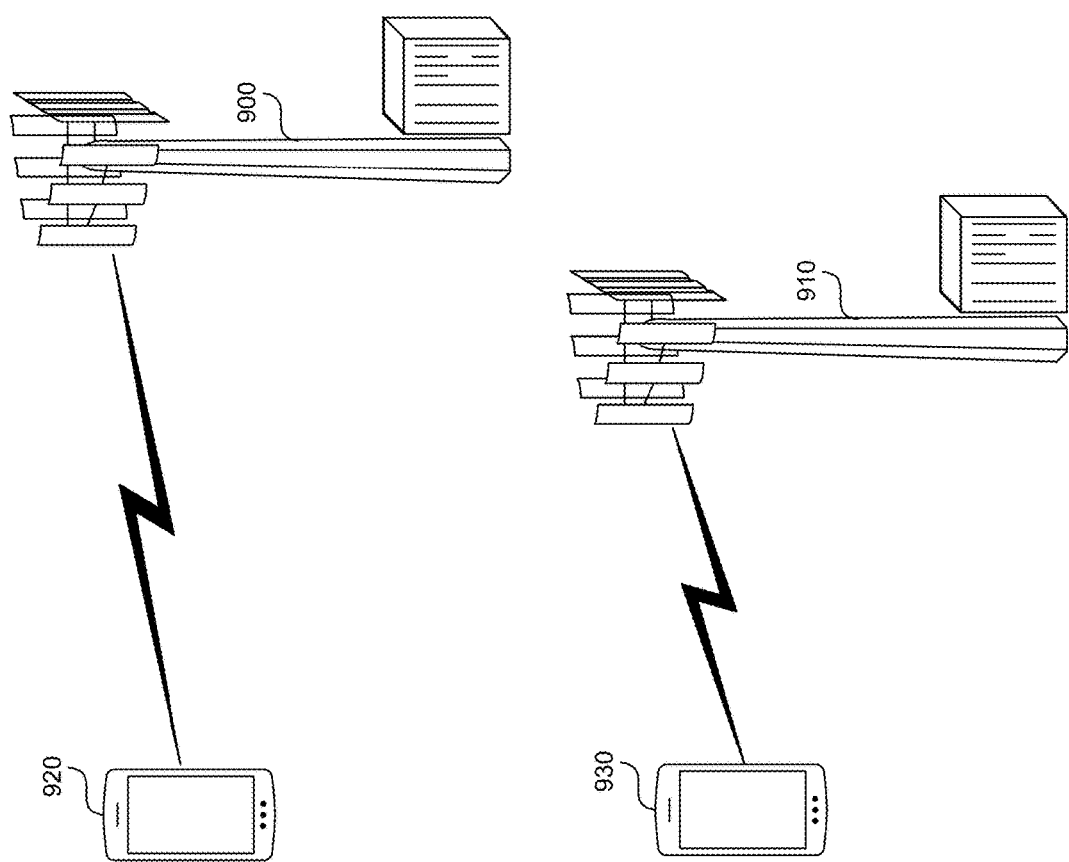
FIG. 9 shows two mobile devices interacting with two wireless telecommunication networks.

FIG. 9 shows two mobile devices 920, 930 interacting with two wireless telecommunication networks 900, 910. The first wireless telecommunication network 900 can provide data 710 in FIG. 1, while the second wireless telecommunication network 910 can provide data 760 in FIG. 2. The two wireless telecommunication networks 900, 910 can have separate hardware. Alternatively, the second wireless telecommunication network 910 can be an MVNO operating on the first wireless telecommunication network 900, and the second wireless telecommunication network 910 can be an MNO supporting the first wireless telecommunication network 900 operating as an MVNO.

Figure 10:
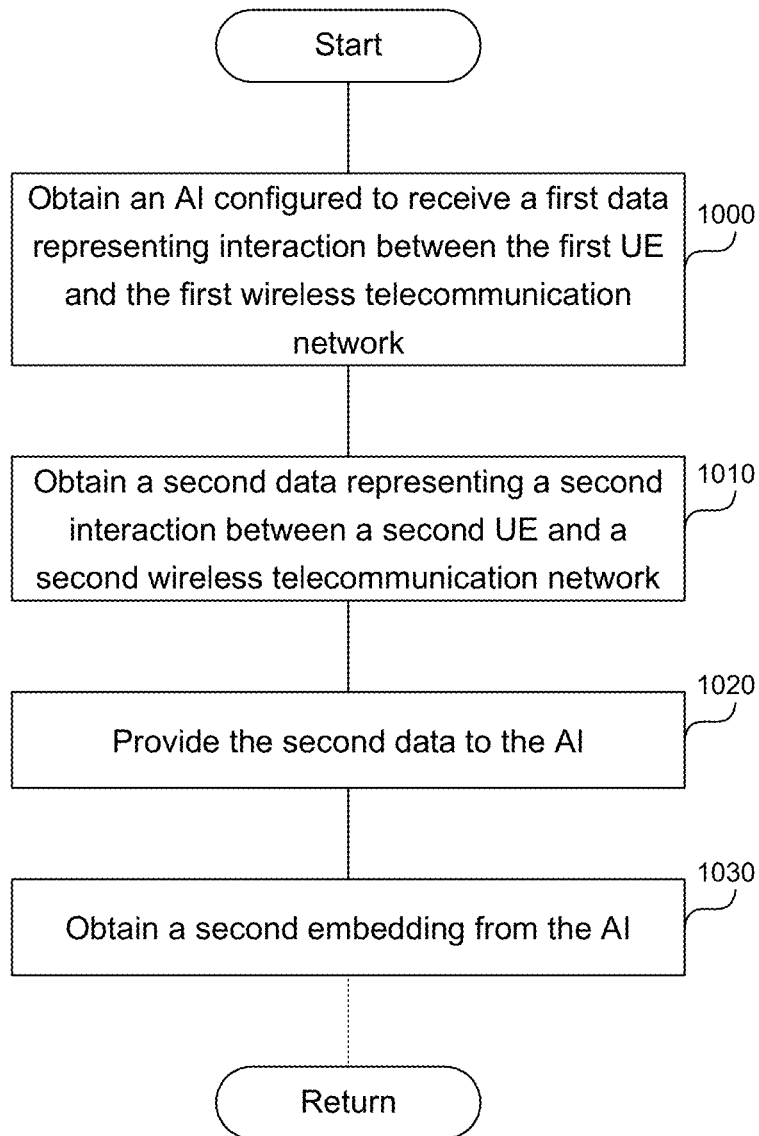
FIG. 10 is a flowchart of a method to create an embedding associated with a data representing an interaction between a mobile device and a wireless telecommunication network.

FIG. 10 is a flowchart of a method to create an embedding associated with a data representing an interaction between a mobile device and a wireless telecommunication network. A hardware or software processor executing instructions described this application can, in step 1000, obtain an encoder configured to receive a first data representing interaction between a first UE and a first wireless telecommunication network. The encoder, e.g., an AI, can produce an output associated with the first UE. The encoder can produce a first embedding representing the first data representing the first interaction between the first UE and the first wireless telecommunication network, where a memory footprint, or dimensionality, of the first embedding is smaller than a memory footprint, or dimensionality, of the first data. The embedding encodes the first data into a format that is not readable by humans, and that cannot be decoded into the first data without the use of the encoder from which a decoder can be constructed.

In step 1010, the processor can obtain a second data representing a second interaction between a second UE and a second wireless telecommunication network, where the second data is different from the first data, and where the second device is different from the first device. The first and the second wireless telecommunication network can be the same network.

In step 1020, the processor can provide the second data to the encoder, where the encoder is configured to produce a second embedding representing the second data associated with the second interaction between the second UE and the second wireless telecommunication network. In step 1030, the processor can obtain the second embedding from the encoder.

The processor can obtain a first data representing a first interaction between a first UE and a first wireless telecommunication network. The first data can include at least three of: phone numbers called, the frequency, duration, and timing of calls, a service purchased by the UE, bandwidth usage associated with the UE, the CDR associated with the UE, geolocation associated with the UE, a plan associated with the UE, a number of lines associated with the UE, a length of time the UE has been associated with the wireless telecommunication network, a unique identifier associated with the UE, interconnected activity associated with the UE, and phone number associated with the UE. The first data can be provided by an MNO network. The processor can train the encoder to receive the first data representing interaction between the first UE and the first wireless telecommunication network and produce an output.

The processor can perform feature extraction based on the first data representing the first interaction between the first UE and the first wireless telecommunication network to obtain first multiplicity of features. The first multiplicity of features can include at least three of: geographic location associated with the first UE, voice data usage associated with the first UE, text message usage associated with the first UE, data usage associated with the first UE, duration of a call associated with the first UE, UE operating system associated with the first UE, average daily usage during weekdays associated with the first UE, and average daily usage during weekends associated with the first UE. The processor can train the encoder using the first multiplicity of features. The processor can perform feature extraction based on the second data representing the second interaction between the second UE and the second wireless telecommunication network to obtain a second multiplicity of features. The processor can provide the second multiplicity of features to the encoder.

The processor can provide the second embedding to a second encoder configured to analyze user information stored in the second embedding and produce an output based on the user information, where the second embedding is configured to not be readable by a human.

The processor can use the embedding to represent a user data because the embedding is not humanly readable. Further, the processor can use the embedding to predict data usage, advertisements to show to a user, etc. The processor can provide the second embedding to the second wireless telecommunication network, where the second embedding is configured to not be readable by a human, and where the second embedding is configured to not be reversible into the second data. The processor can cause a prediction of a data usage associated with the UE or a prediction of information to present to the UE based on the second embedding.

Figure 11:
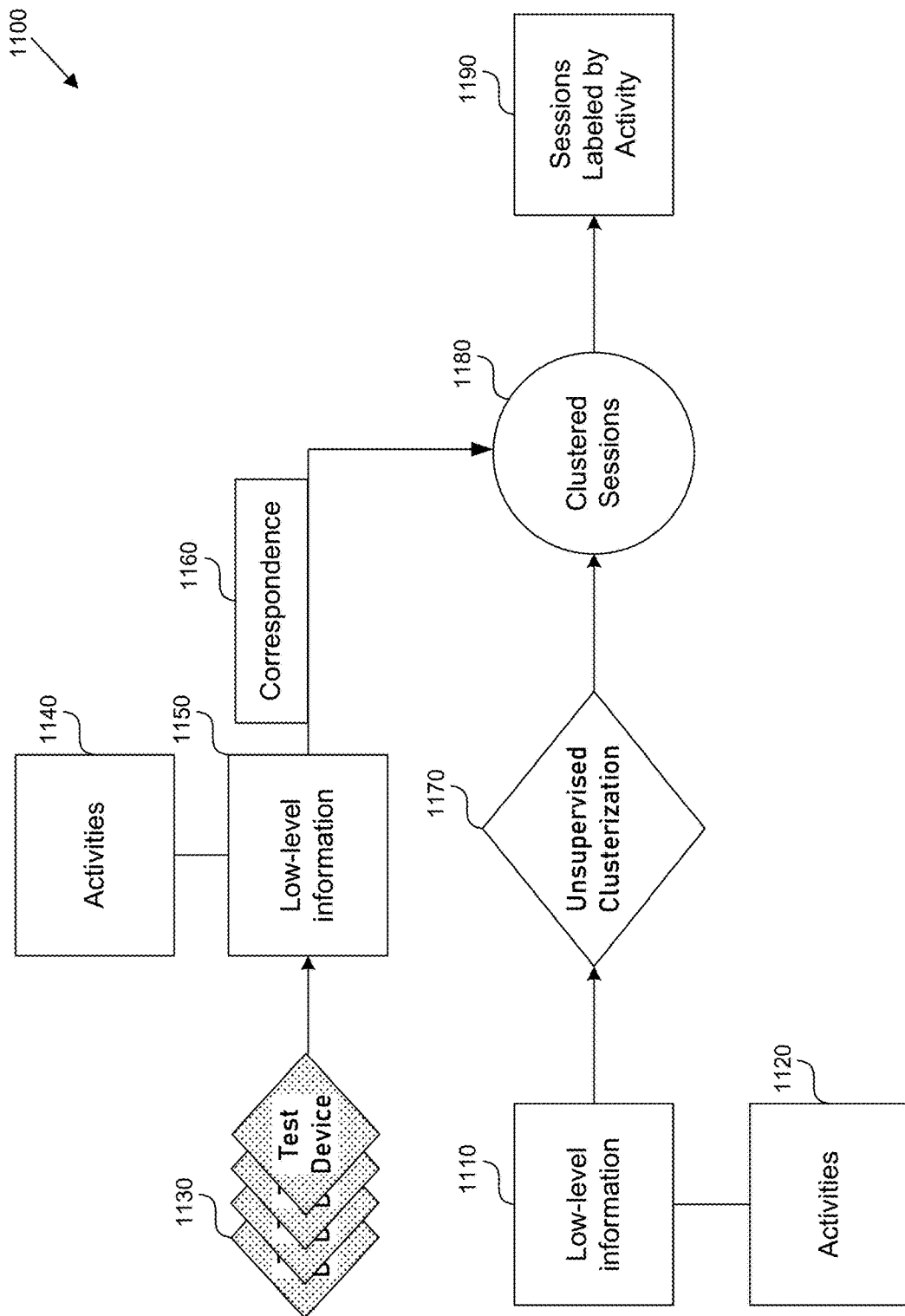
FIG. 11 shows a system to determine an activity associated with a UE based on a low-level machine generated information representing the activity.

Determining an Activity Associated With a Mobile Device Based on a Low-Level Information Representing the Activity FIG. 11 shows a system to determine an activity associated with a UE based on a low-level machine generated information representing the activity. The system 1100 can obtain the low-level machine generated information ("low-level information") 1110 representing the activity associated with the UE. The low-level machine generated information 1110 can be a log generated by a device, such as a CDR generated by a wireless telecommunication network, viewership information generated by a TV network, etc. The system 1100 cannot map the low-level information 1110 to a high-level information, e.g., one or more activities 1120 performed by UE operating on the network 100 in FIG. 1.

For example, the low-level information 1110 can include a time of communication, and IP address of a server, a response from the server, an acknowledgment from the UE, a size of a packet sent to the server, etc. However, the system 1100 cannot determine, from this low-level information 1110, what activity 1120 the user was engaged in, whether it was a streaming activity, a Wi-Fi call, web browsing, game playing, etc.

To determine the activities 1120, the system 1100 can connect multiple test devices 1130 to the network 100. The multiple test devices 1130 can be various UEs. Multiple test devices 1130 can interact with the network 100 to perform various activities 1140 that the UEs already connected to the network perform, such as browsing the Internet, streaming videos, engaging in phone calls, text messages, playing video games, etc. The types of activities 1120 and 1140 are generally the same. The multiple test devices 1130 can produce low-level information 1150 associated with the activity 1140, however, the system 1100 has a correspondence 1160 mapping the low-level information 1150 to the activity 1140.

Figure 12A:
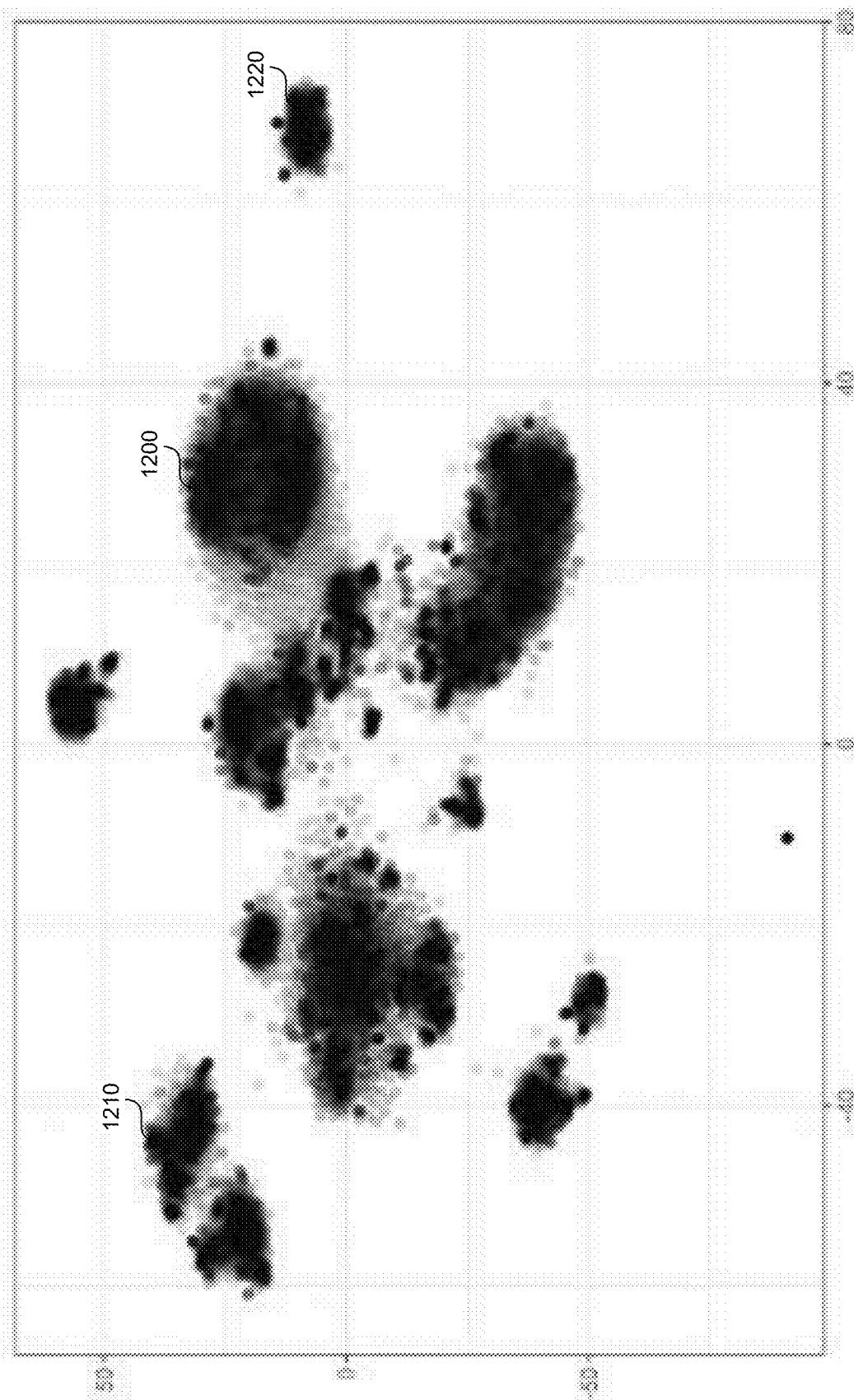
FIG. 12A shows clustering of low-level information.
Figure 12B:
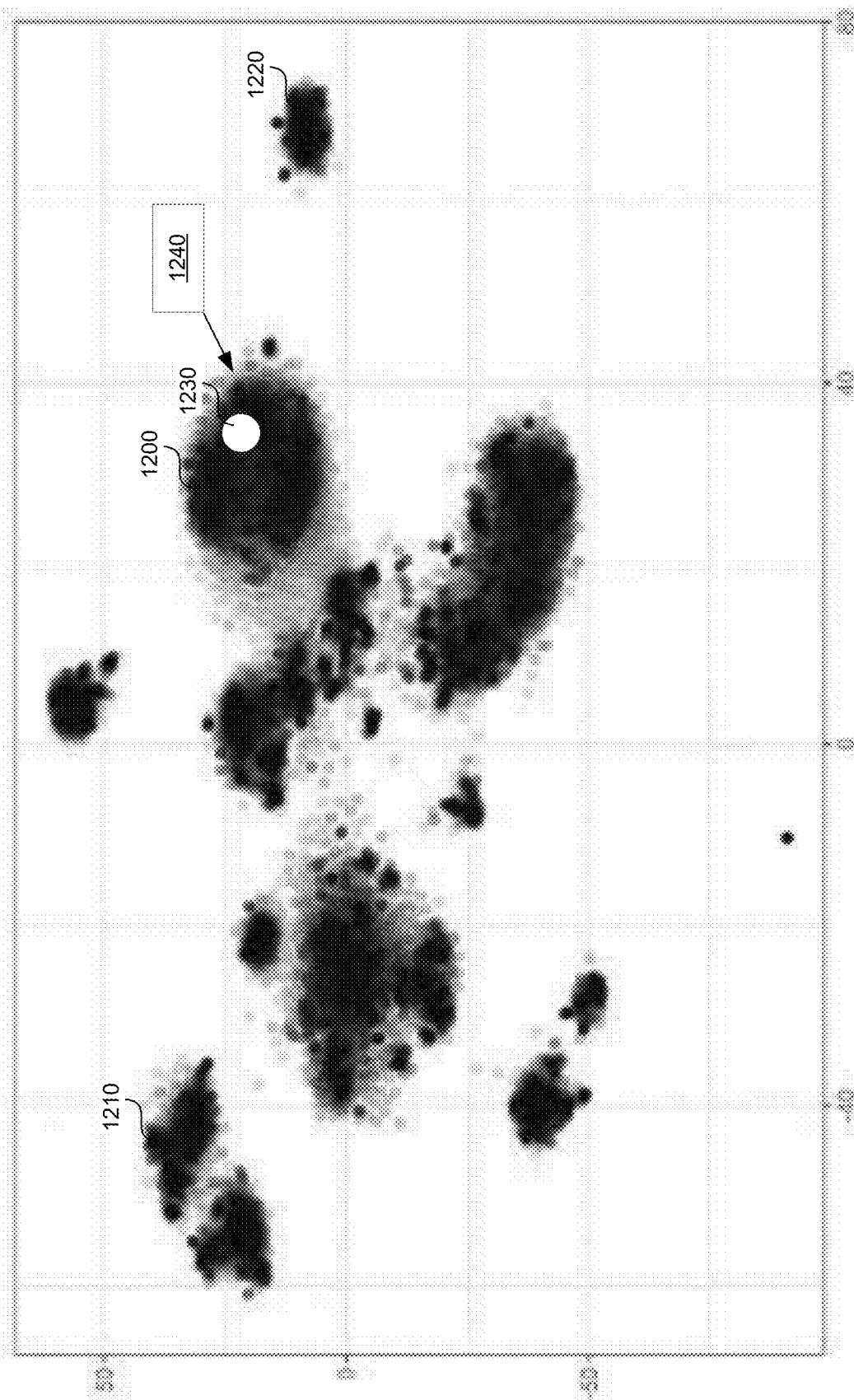
FIG. 12B shows clustering and labeling of low-level information.

In step 1170, the system 1100 can cluster the low-level information 1110, or an embedding of the low-level information, as explained in this application, into multiple clusters as shown in FIGS. 12A-12B. However, the multiple clusters are not mapped to an activity because the mapping between the low-level information 1110 and the activities 1120 is not known. The system 1100 can use density-based clustering to create the clusters in FIG. 12A-12B.

In step 1180, the system 1100 can use the same clustering algorithm, such as density-based clustering, to cluster activities 1140 into the multiple clusters as shown in FIGS. 12A-12B. Consequently, low-level information 1150 is clustered with similar low-level information 1110, as explained in FIGS. 12A-12B.

The system 1100 can determine a particular activity among the activities 1140 represented by a particular clustered low-level information among the low-level information 1150 because of the correspondence 1160. Consequently, in step 1190, the system 1100 can determine that the whole cluster to which the particular clustered low-level information belongs represents the particular activity.

FIG. 12A shows clustering of low-level information 1110 in FIG. 11. The system 1100 in FIG. 11, in step 1170 in FIG. 11, can create the multiple clusters 1200, 1210, 1220, (only three are labeled for brevity) based on low-level information 1110 in FIG. 11. The clusters 1200, 1210, 1220 indicate a grouping of similar low-level information 1110, however, the system 1100 does not have a mapping between the clusters 1200, 1210, 1220 and the activities 1120.

FIG. 12B shows clustering and labeling of low-level information 1150 in FIG. 11. The system 1100, in step 1180 in FIG. 11, can cluster the low-level information 1150 into the already existing clusters 1200, 1210, 1220. For example, a subset 1230 of low-level information 1150 can be clustered into the cluster 1200. In addition, the subset 1230 of low-level information 1150 can have a correspondence to an activity 1240, such as video streaming. Consequently, the system 1100 can determine that the whole cluster 1200 corresponds to the activity 1240. Similarly, the system 1100 can assign activities to all the clusters shown in FIGS. 12A-12B, 1200, 1210, 1220.

The system 1100 can determine various attributes of the clusters 1200, 1210, 1220 such as longevity with a provider of connectivity to the UE, e. g. network 100 in FIG. 1, television (TV) provider, etc. The system 1100 can determine a profitability of the clusters 1200, 1210, 1220. For example, the system 1100 can determine an average of the attribute for all the UEs in a particular cluster 1200, 1210, 1220. The system 1100 determines the clusters 1200 that have a high level of desirable attributes, such as longevity or profitability, and can determine clusters 1210 that have a low level of desirable attributes. The system 1100 can determine the difference between service provided to the cluster 1200 and the service provided to the cluster 1210. Based on what the difference is, the system 1100 can improve the service to the cluster 1210.

The system 1100 can extract attributes of UEs in the cluster 1200 having a high desirable attribute. The attributes of the UE can include such users as sports fans, social media users, online shoppers, etc. The system 1100 can identify the steps the system 1100 performed prior to the UE joining the network 100. The system can identify similar attributes in a group of UEs that are not currently part of the network 100. Consequently, the system 1100 can initiate performing the same steps to incentivize UEs that are not currently part of the network 100 to join the network. Further, the system 1100 can determine activities of the UEs in the cluster 1200, having a high level of desirable attributes, and can provide offers and promotions for activities in which the desired cluster 1200 engages to UEs that are not currently part of the network 100. For example, the desired cluster 1200 can consume sports content on UEs during the weekend and lifestyle shows during weekdays, and the system 1100 can offer discounts for such activities.

The low-level information 1110, 1150, in addition to low-level information from a wireless telecommunication network, can also include data regarding TV viewership such as name of user, date a program was viewed, time the program was viewed, channel of the program, program, geolocation of the user, user home device such as Roku, duration of watching the program, etc.

The low-level information can represent a log of operation of the network 100, and the activity can indicate a failure of a component of the network. The system 1100 can cluster the information into multiple clusters, where a cluster 1220 indicates activity prior to the failure of the network component. The system can continue clustering incoming low-level information. When the incoming low-level information is clustered into the cluster 1220, the system can predict that the failure is about to occur and can notify appropriate components prior to the occurrence of the failure, thus preventing the failure.

Figure 13:
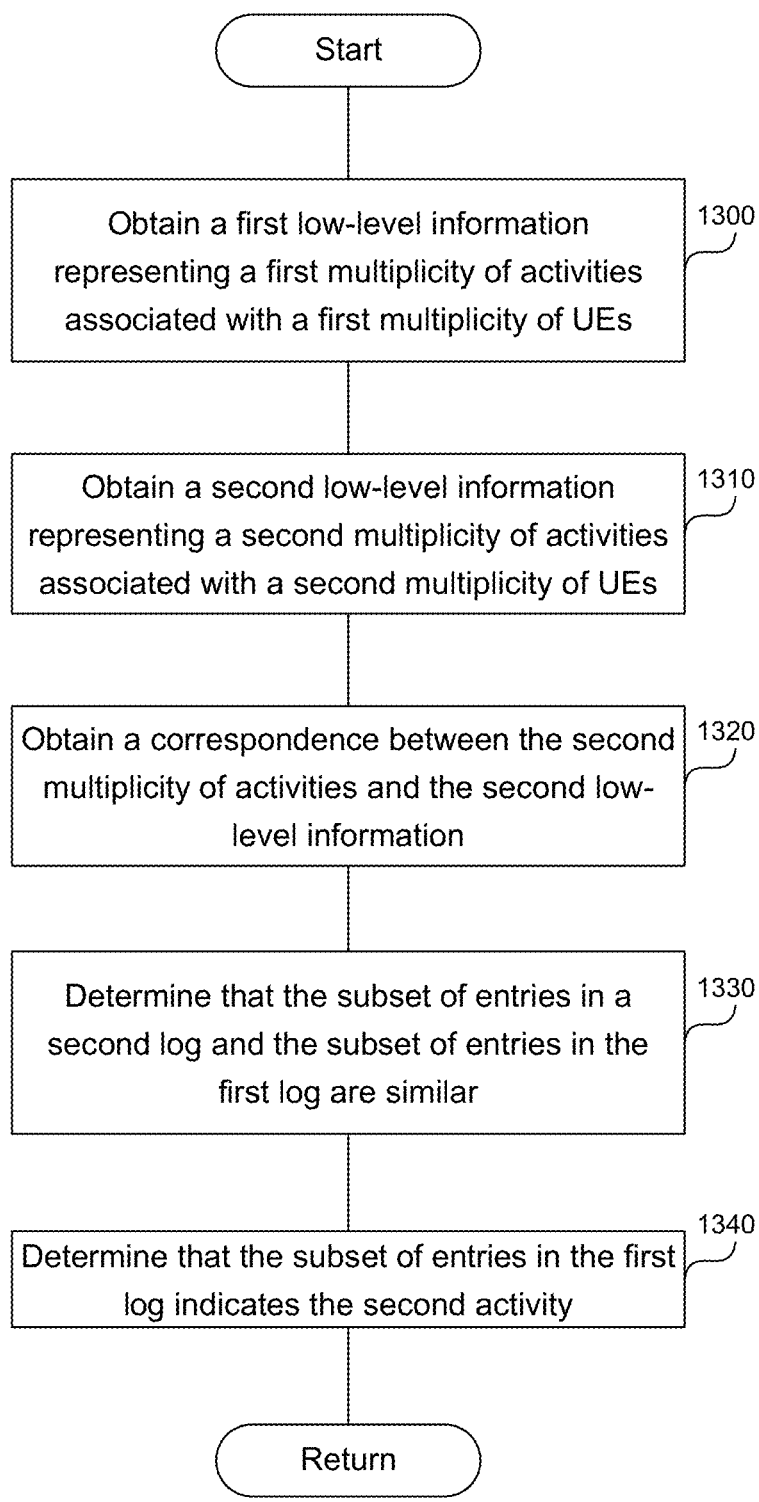
FIG. 13 is a flowchart of a method to determine an activity associated with a mobile device among multiple mobile devices based on a low-level information representing the activity.

FIG. 13 is a flowchart of a method to determine an activity associated with a mobile device among multiple mobile devices based on a low-level information representing the activity. In step 1300, a hardware or software processor executing instructions described in this application can obtain a first low-level information representing a first multiplicity of activities associated with a first multiplicity of UEs, where a first activity among the first multiplicity of activities represents an interaction between the UE among the first multiplicity of UEs and a provider of connectivity to the UE, e.g., a wireless telecommunication network. The first low-level information can include a first log including a first multiplicity of entries associated with the first activity. An entry among the first multiplicity of entries can be associated with various activities, such as a phone call, text message, Internet browsing, etc. The log can be a CDR. The processor cannot determine the activity based on entry. The log is generated by a computer, entails detailed records of the activity, and cannot be interpreted by a human. Consequently, the activity associated with the UE is not known.

In step 1310, the processor can obtain a second low-level information representing a second multiplicity of activities associated with a second multiplicity of UEs, where the second low-level information includes a second log comprising a second multiplicity of entries.

In step 1320, the processor can obtain a correspondence between the second multiplicity of activities and the second low-level information, where the correspondence maps a second activity among the second multiplicity of activities to a subset of entries in the second log.

In step 1330, the processor can determine that the subset of entries in the second log and a subset of entries in the first log are similar. In step 1340, the processor can determine that the subset of entries in the first log indicates the second activity. The processor can perform the same steps for all the entries in the first log.

To determine that the subset of entries in the second log and the subset of entries in the first log are similar, the processor can create multiple clusters based on the first low-level information representing the first multiplicity of activities associated with the multiple devices. The multiple clusters can represent a grouping of the first low-level information into multiple groups. A cluster among the multiple clusters indicates a subset of entries in the first log. The cluster is not labeled. In other words, the processor does not have an activity associated with the cluster. The processor can cluster the subset of entries in the second log into the cluster among the multiple clusters. The processor can determine that the subset of entries in the first log is similar to the subset of entries in the second log, and consequently that the subset of entries in the first log represents the second activity associated with the second log. The second activity can be watching a streaming service. Consequently, the processor can determine that all the low-level information in the cluster corresponds to watching the streaming service.

The processor can encode the low-level information to create an embedding and then can cluster the embedding as opposed to clustering the low-level information. The processor can reduce dimensionality associated with the first low-level information by creating a first low-dimensionality data set, where the first low-dimensionality data set represents the first multiplicity of activities associated with the first multiplicity of devices. The low-dimensionality data set can be the embedding. Dimensionality reduction techniques can include backward illumination, forward selection, random forests, principal component analysis, factor analysis, latent dirichlet allocation, truncated singular value decomposition, kernel principal component analysis, T-distributed Stochastic Neighbor Embedding, multidimensional scaling, isomap, etc. The processor can create the multiple clusters based on the first low-dimensionality data set representing the first multiplicity of activities associated with the first multiplicity of devices. The processor can reduce dimensionality associated with the second low-level information by creating a second low-dimensionality data set, where the second low-dimensionality data set represents the second multiplicity of activities associated with the second multiplicity of devices. The processor can cluster the second low-dimensionality data set into the cluster among the multiple clusters. The processor can obtain a second correspondence between the second multiplicity of activities and the second low-dimensionality data set, where the correspondence maps a second activity among the second multiplicity of activities to data in the second low-dimensionality data set. The processor can determine that the cluster indicates the second activity.

The processor can analyze a desired attribute of the cluster such as longevity or profitability and determine a service provided to the cluster that may be causing the desired attribute. The processor can calculate an average of an attribute associated with the cluster among the multiple clusters. The attribute can include longevity or profitability. The processor can determine a third cluster among the multiple clusters, where the average of the attribute associated with the third cluster satisfies a predetermined criterion, such as two years with the wireless telecommunication network, a profitability above a predetermined threshold, etc. The criterion can also indicate that the average of the attribute is an outlier among all the clusters. The processor can determine multiple groups of attributes associated with a provider of connectivity to the UE. The provider of connectivity to the UE can be a wireless telecommunication network, or a TV network, an Internet provider, etc. A group of attributes among the multiple groups of attributes corresponds to the cluster among the multiple clusters. A third group of attributes among the multiple groups of attributes corresponds to the third cluster among the multiple clusters. The processor can determine an attribute among the third group of attributes, where the attribute among the third group of attributes is an outlier among the multiple groups of attributes. An outlier is an attribute that is different from or stands out from multiple groups of attributes. The attribute can be quality of service associated with the wireless telecommunication network, or engagement level of the client on the wireless telecommunication network. The processor can provide a notification including the third attribute, where the notification indicates that the third attribute is relevant, e.g., causal, to achieving the attribute associated with the cluster, such as longevity or profitability of the client.

The processor can extract attributes of clusters of customers with biggest longevity/profitability. The processor can determine the steps leading to the mobile device joining the wireless telecommunication network and can repeat the steps for mobile devices not currently on the network. The processor can also determine attributes of the desired group and advertise to mobile devices having similar attributes. The processor can calculate an average of an attribute associated with the cluster among the multiple clusters. The processor can determine a third cluster among the multiple clusters, where the average of the attribute associated with the third cluster satisfies a predetermined criterion. The third cluster is associated with a third multiplicity of UEs. The processor can determine a process performed prior to the third multiplicity of UEs connecting to a provider of connectivity to the UE. The processor can initiate the process with a second UE that is not connected to the provider of connectivity to the UE.

The first low-level information can represent TV viewership, streaming service consumption, Internet browsing history, etc. The processor can obtain the first low-level information representing a first multiplicity of activities associated with the first multiplicity of UEs, where the first low-level information includes at least two of: a name of a user associated with the UE, a date associated with the first activity, a time associated with the first activity, a channel associated with the first activity, a geographic location associated with the UE, a type of the UE such as a Roku, and a duration of the first activity. The processor can obtain the second low-level information representing a second multiplicity of activities associated with the second multiplicity of UEs, where the second activity among the second multiplicity of activities includes a second content provided to the second UE among the second multiplicity of UEs. The second low-level information can include at least two of: a name of a user associated with the UE, a date associated with the first activity, a time associated with the first activity, a channel associated with the first activity, program associated with the first activity, a geographic location associated with the UE, a type of the UE, and a duration of the first activity. The processor can obtain a correspondence between the second multiplicity of activities and the second low-level information, where the correspondence maps the second content to a subset of second low-level information. The processor can cluster the subset of second low-level information into the cluster among the multiple clusters. The processor can determine that a subset of the first low-level information belonging to the cluster indicates consumption of the second content.

The processor can provide offers and promotions for activities in which the desired cluster engages. For example, a particular desired cluster can consume sports contents on UEs during the weekend and lifestyle shows during weekdays. The processor can determine a value of an attribute associated with the cluster among the multiple clusters. The processor can determine a third cluster among the multiple clusters, where the value of the attribute associated with the third cluster satisfies a predetermined criterion. The third cluster is associated with a third multiplicity of UEs. The predetermined criterion can include two years or more with the wireless telecommunication network, profitability above a predetermined threshold, etc. The predetermined criterion can also indicate that the value of the attribute is an outlier among all the clusters. The processor can determine a third activity associated with the third cluster. The processor can provide an incentive to engage in the third activity to a third UE in the third multiplicity of UEs. Alternatively, the processor can provide that incentive to the UE that is not part of the wireless telecommunication network.

The processor can recognize that a low-level information pattern leads to a certain failure and can prevent the failure before it occurs. The processor can obtain the first low-level information representing the first multiplicity of activities associated with a provider of connectivity to the UE. The processor can obtain the second low-level information representing the second multiplicity of activities associated with the second multiplicity of UEs. A second activity among the second multiplicity of activities includes a failure associated with the provider of connectivity to the UE. That is, each activity among the second multiplicity of activities led to a failure of the network. The processor can obtain a correspondence between the second multiplicity of activities and the second low-level information, where the correspondence maps the failure associated with the provider of connectivity to the UE to a subset of second low-level information. The processor can cluster the subset of second low-level information into the cluster among the multiple clusters. The processor can determine that a subset of the first low-level information belonging to the cluster indicates the failure associated with the provider of connectivity to the UE.

Computer System

Figure 14:
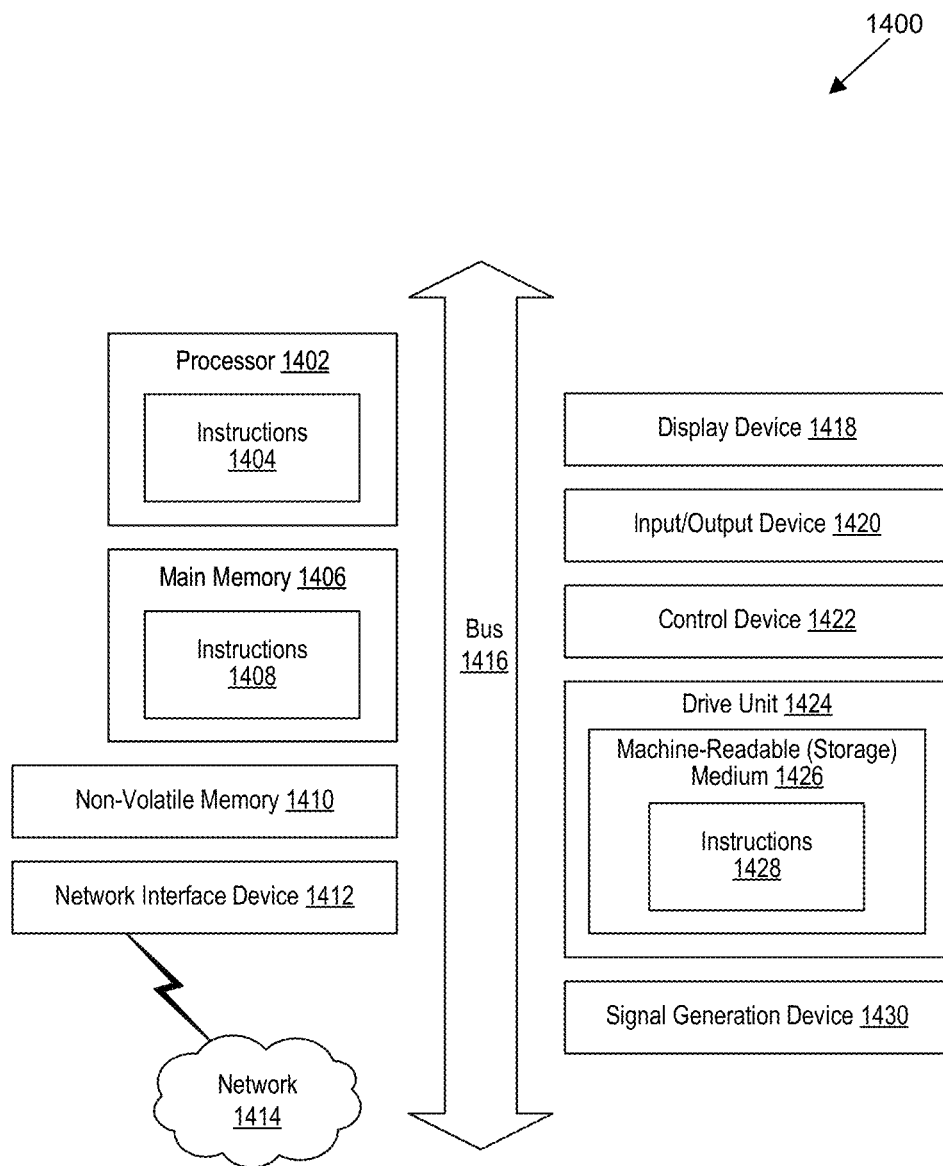
FIG. 14 is a block diagram that illustrates an example of a computer system in which at least some operations described herein can be implemented.

FIG. 14 is a block diagram that illustrates an example of a computer system 1400 in which at least some operations described herein can be implemented. As shown, the computer system 1400 can include: one or more processors 1402, main memory 1406, non-volatile memory 1410, a network interface device 1412, video display device 1418, an input/output device 1420, a control device 1422 (e.g., keyboard and pointing device), a drive unit 1424 that includes a storage medium 1426, and a signal generation device 1430 that are all communicatively connected to a bus 1416. The bus 1416 represents one or more physical buses and/or point-to-point connections that are connected by appropriate bridges, adapters, or controllers. Various common components (e.g., cache memory) are omitted from FIG. 14 for brevity. Instead, the computer system 1400 is intended to illustrate a hardware device on which components illustrated or described relative to the examples of the Figures and any other components described in this specification can be implemented.

The computer system 1400 can take any suitable physical form. For example, the computing system 1400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1400. In some implementations, the computer system 1400 can be an embedded computer system, a system-on-chip (SOC), a single-board computer system (SBC), or a distributed system such as a mesh of computer systems or include one or more cloud components in one or more networks. Where appropriate, one or more computer systems 1400 can perform operations in real time, near real time, or in batch mode.

The network interface device 1412 enables the computing system 1400 to mediate data in a network 1414 with an entity that is external to the computing system 1400 through any communication protocol supported by the computing system 1400 and the external entity. Examples of the network interface device 1412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1406, non-volatile memory 1410, machine-readable medium 1426) can be local, remote, or distributed. Although shown as a single medium, the machine-readable medium 1426 can include multiple media (e.g., a centralized/distributed database and/or associated caches and servers) that store one or more sets of instructions 1428. The machine-readable (storage) medium 1426 can include any medium that is capable of storing, encoding, or carrying a set of instructions for execution by the computing system 1400. The machine-readable medium 1426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in computing device(s). When read and executed by the processor 1402, the instruction(s) cause the computing system 1400 to perform operations to execute elements involving the various aspects of the disclosure.

Remarks

The terms "example", "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. At least one non-transitory computer-readable storage medium storing instructions to determine an activity associated with a mobile device among multiple mobile devices based on low-level information representing the activity, which, when executed by at least one data processor of a system, cause the system to:
   obtain a first low-level information representing a first multiplicity of activities associated with a first multiplicity of mobile devices,
      wherein a first activity among the first multiplicity of activities represents an interaction between the mobile device among the first multiplicity of mobile devices and a wireless telecommunication network,
      wherein the first low-level information includes a first log including a first multiplicity of entries associated with the first activity,
      wherein an entry among the first multiplicity of entries can be associated with various activities;
   create multiple clusters based on the first low-level information representing the first multiplicity of activities associated with the first multiplicity of mobile devices,
      wherein the multiple clusters represent a grouping of the first low-level information into multiple groups,
      wherein a cluster among the multiple clusters includes a subset of entries in the first log;
   determine an activity represented by the subset of entries included in the cluster among the multiple clusters by:
      obtaining a second low-level information representing a second multiplicity of activities associated with a second multiplicity of mobile devices and a correspondence between the second multiplicity of activities and the second low-level information,
         wherein the second low-level information includes a second log comprising a second multiplicity of entries,
         wherein the correspondence maps a second activity among the second multiplicity of activities to a subset of entries in the second log;
      clustering the subset of entries in the second log into the cluster including the subset of entries in the first log; and
      based on the correspondence, determining that the subset of entries in the first log belonging to the cluster indicates the second activity.

2. The at least one non-transitory computer-readable storage medium of claim 1, comprising instructions to:
   reduce dimensionality associated with the first low-level information by creating a first low-dimensionality data set,
      wherein the first low-dimensionality data set represents the first multiplicity of activities associated with the first multiplicity of mobile devices;
   create the multiple clusters based on the first low-dimensionality data set representing the first multiplicity of activities associated with the first multiplicity of mobile devices;
   reduce dimensionality associated with the second low-level information by creating a second low-dimensionality data set,
      wherein the second low-dimensionality data set represents the second multiplicity of activities associated with the second multiplicity of mobile devices;
   cluster the second low-dimensionality data set into the cluster among the multiple clusters;
   obtain the correspondence between the second multiplicity of activities and the second low-dimensionality data set,
      wherein the correspondence maps the second activity among the second multiplicity of activities to data in the second low-dimensionality data set; and
   determine that the cluster indicates the second activity.

3. The at least one non-transitory computer-readable storage medium of claim 1, comprising instructions to:
   calculate an average of an attribute associated with the cluster among the multiple clusters;
   determine a third cluster among the multiple clusters, wherein the average of the attribute associated with the third cluster satisfies a predetermined criterion;

determine multiple groups of attributes associated with the wireless telecommunication network,
    wherein a group of attributes among the multiple groups of attributes corresponds to the cluster among the multiple clusters,
    wherein a third group of attributes among the multiple groups of attributes corresponds to the third cluster among the multiple clusters;
determine a third attribute among the third group of attributes,
    wherein the third attribute among the third group of attributes is an outlier among the multiple groups of attributes; and
provide a notification including the third attribute.

4. The at least one non-transitory computer-readable storage medium of claim 1, comprising instructions to:
calculate an average of an attribute associated with the cluster among the multiple clusters;
determine a third cluster among the multiple clusters,
    wherein the average of the attribute associated with the third cluster satisfies a predetermined criterion,
    wherein the third cluster is associated with a third multiplicity of mobile devices;
determine a process performed prior to the third multiplicity of mobile devices connecting to the wireless telecommunication network; and
initiate the process with a second mobile device that is not connected to the wireless telecommunication network.

5. The at least one non-transitory computer-readable storage medium of claim 1, comprising instructions to:
obtain the first low-level information representing the first multiplicity of activities associated with the first multiplicity of mobile devices,
    wherein the first low-level information includes at least two of: a name of a user associated with the mobile device, a date associated with the first activity, a time associated with the first activity, a channel associated with the first activity, a geographic location associated with the mobile device, a type of the mobile device, and a duration of the first activity;
obtain the second low-level information representing the second multiplicity of activities associated with the second multiplicity of mobile devices,
    wherein the second activity among the second multiplicity of activities includes a second content provided to a second mobile device among the second multiplicity of mobile devices,
    wherein the second low-level information includes at least two of: a name of a user associated with the mobile device, a date associated with the first activity, a time associated with the first activity, a channel associated with the first activity, program associated with the first activity, a geographic location associated with the mobile device, a type of the mobile device, and a duration of the first activity;
obtain the correspondence between the second multiplicity of activities and the second low-level information,
    wherein the correspondence maps the second content to a subset of second low-level information; and
cluster the subset of second low-level information into the cluster among the multiple clusters; and
determine that a subset of the first low-level information belonging to the cluster indicates consumption of the second content.

6. A method comprising:
obtaining a first low-level information representing a first multiplicity of activities associated with a first multiplicity of UEs,
    wherein the first low-level information includes a first log including a first multiplicity of entries,
    wherein an entry among the first multiplicity of entries can be associated with various activities;
determining an activity represented by the first low-level information by:
    obtaining a second low-level information representing a second multiplicity of activities associated with a second multiplicity of UEs and a correspondence between the second multiplicity of activities and the second low-level information,
        wherein the second low-level information includes a second log comprising a second multiplicity of entries,
        wherein the correspondence maps a second activity among the second multiplicity of activities to a subset of entries in the second log;
    determining that the subset of entries in the second log and a subset of entries in the first log are similar; and
    based on the determination of similarity, determining that the subset of entries in the first log indicates the second activity.

7. The method of claim 6, wherein determining that the subset of entries in the second log and the subset of entries in the first log are similar comprises:
creating multiple clusters based on the first low-level information representing the first multiplicity of activities associated with the first multiplicity of UEs,
    wherein the multiple clusters represent a grouping of the first low-level information into multiple groups,
    wherein a cluster among the multiple clusters indicates the subset of entries in the first log;
clustering the subset of entries in the second log into the cluster among the multiple clusters; and
determining that the subset of entries in the first log are similar to the subset of entries in the second log.

8. The method of claim 7, comprising:
reducing dimensionality associated with the first low-level information by creating a first low-dimensionality data set,
    wherein the first low-dimensionality data set represents the first multiplicity of activities associated with the first multiplicity of UEs;
creating the multiple clusters based on the first low-dimensionality data set representing the first multiplicity of activities associated with the first multiplicity of UEs;
reducing dimensionality associated with the second low-level information by creating a second low-dimensionality data set,
    wherein the second low-dimensionality data set represents the second multiplicity of activities associated with the second multiplicity of UEs;
clustering the second low-dimensionality data set into the cluster among the multiple clusters;
obtaining the correspondence between the second multiplicity of activities and the second low-dimensionality data set,
    wherein the correspondence maps the second activity among the second multiplicity of activities to data in the second low-dimensionality data set; and
determining that the cluster indicates the second activity.

9. The method of claim 7, comprising:
calculating an average of an attribute associated with the cluster among the multiple clusters;
determining a third cluster among the multiple clusters, wherein the average of the attribute associated with the third cluster satisfies a predetermined criterion;
determining multiple groups of attributes associated with a provider of connectivity to a UE,
  wherein a group of attributes among the multiple groups of attributes corresponds to the cluster among the multiple clusters,
  wherein a third group of attributes among the multiple groups of attributes corresponds to the third cluster among the multiple clusters;
determining a third attribute among the third group of attributes,
  wherein the third attribute among the third group of attributes is an outlier among the multiple groups of attributes; and
providing a notification including the third attribute.

10. The method of claim 7, comprising:
calculating an average of an attribute associated with the cluster among the multiple clusters;
determining a third cluster among the multiple clusters, wherein the average of the attribute associated with the third cluster satisfies a predetermined criterion, wherein the third cluster is associated with a third multiplicity of UEs;
determining a process performed prior to the third multiplicity of UEs connecting to a provider of connectivity to a UE; and
initiating the process with a second UE that is not connected to the provider of connectivity to the UE.

11. The method of claim 7, comprising:
obtaining the first low-level information representing the first multiplicity of activities associated with the first multiplicity of UEs,
  wherein the first low-level information includes at least two of: a name of a user associated with a UE, a date associated with a first activity, a time associated with the first activity, a channel associated with the first activity, a geographic location associated with the UE, a type of the UE, and a duration of the first activity;
obtaining the second low-level information representing the second multiplicity of activities associated with the second multiplicity of UEs,
  wherein the second activity among the second multiplicity of activities includes a second content provided to a second UE among the second multiplicity of UEs,
  wherein the second low-level information includes at least two of: a name of a user associated with the UE, a date associated with the first activity, a time associated with the first activity, a channel associated with the first activity, program associated with the first activity, a geographic location associated with the UE, a type of the UE, and a duration of the first activity;
obtaining the correspondence between the second multiplicity of activities and the second low-level information,
  wherein the correspondence maps the second content to a subset of second low-level information;
clustering the subset of second low-level information into the cluster among the multiple clusters; and
determining that a subset of the first low-level information belonging to the cluster indicates consumption of the second content.

12. The method of claim 7, comprising:
obtaining the first low-level information representing the first multiplicity of activities associated with a provider of connectivity to a UE,
obtaining the second low-level information representing the second multiplicity of activities associated with the second multiplicity of UEs,
  wherein the second activity among the second multiplicity of activities includes a failure associated with the provider of connectivity to the UE;
obtaining the correspondence between the second multiplicity of activities and the second low-level information,
  wherein the correspondence maps the failure associated with the provider of connectivity to the UE to a subset of second low-level information; and
clustering the subset of second low-level information into the cluster among the multiple clusters; and
determining that a subset of the first low-level information belonging to the cluster indicates the failure associated with the provider of connectivity to the UE.

13. A system comprising:
obtain a first low-level information representing a first multiplicity of activities associated with a first multiplicity of UEs,
  wherein the first low-level information includes a first log including a first multiplicity of entries,
  wherein an entry among the first multiplicity of entries can be associated with various activities;
determine an activity represented by the first low-level information by:
  obtaining a second low-level information representing a second multiplicity of activities associated with a second multiplicity of UEs and a correspondence between the second multiplicity of activities and the second low-level information,
    wherein the second low-level information includes a second log comprising a second multiplicity of entries,
    wherein the correspondence maps a second activity among the second multiplicity of activities to a subset of entries in the second log;
  determining that the subset of entries in the second log and the subset of entries in the first log are similar; and
  based on the determination of similarity, determining that the subset of entries in the first log indicates the second activity.

14. The system of claim 13, wherein the instructions to determine that the subset of entries in the second log and the subset of entries in the first log are similar comprise instructions to:
create multiple clusters based on the first low-level information representing the first multiplicity of activities associated with the first multiplicity of UEs,
  wherein the multiple clusters represent a grouping of the first low-level information into multiple groups,
  wherein a cluster among the multiple clusters indicates the subset of entries in the first log;
cluster the subset of entries in the second log into the cluster among the multiple clusters; and
determine that the subset of entries in the first log are similar to the subset of entries in the second log.

15. The system of claim of claim 14, comprising instructions to:
reduce dimensionality associated with the first low-level information by creating a first low-dimensionality data set,
wherein the first low-dimensionality data set represents the first multiplicity of activities associated with the first multiplicity of UEs;
create the multiple clusters based on the first low-dimensionality data set representing the first multiplicity of activities associated with the first multiplicity of UEs;
reduce dimensionality associated with the second low-level information by creating a second low-dimensionality data set,
wherein the second low-dimensionality data set represents the second multiplicity of activities associated with the second multiplicity of UEs;
cluster the second low-dimensionality data set into the cluster among the multiple clusters;
obtain the correspondence between the second multiplicity of activities and the second low-dimensionality data set,
wherein the correspondence maps the second activity among the second multiplicity of activities to data in the second low-dimensionality data set; and
determine that the cluster indicates the second activity.

16. The system of claim of claim 14, comprising instructions to:
calculate an average of an attribute associated with the cluster among the multiple clusters;
determine a third cluster among the multiple clusters, wherein the average of the attribute associated with the third cluster satisfies a predetermined criterion;
determine multiple groups of attributes associated with a provider of connectivity to a UE,
wherein a group of attributes among the multiple groups of attributes corresponds to the cluster among the multiple clusters,
wherein a third group of attributes among the multiple groups of attributes corresponds to the third cluster among the multiple clusters;
determine a third attribute among the third group of attributes,
wherein the third attribute among the third group of attributes is an outlier among the multiple groups of attributes; and
provide a notification including the third attribute.

17. The system of claim of claim 14, comprising instructions to:
calculate an average of an attribute associated with the cluster among the multiple clusters;
determine a third cluster among the multiple clusters, wherein the average of the attribute associated with the third cluster satisfies a predetermined criterion, wherein the third cluster is associated with a third multiplicity of UEs;
determine a process performed prior to the third multiplicity of UEs connecting to a provider of connectivity to a UE; and
initiate the process with a second UE that is not connected to the provider of connectivity to the UE.

18. The system of claim of claim 14, comprising instructions to:
obtain the first low-level information representing a first multiplicity of activities associated with the first multiplicity of UEs,
wherein the first low-level information includes at least two of: a name of a user associated with a UE, a date associated with a first activity, a time associated with the first activity, a channel associated with the first activity, a geographic location associated with the UE, a type of the UE, and a duration of the first activity;
obtain the second low-level information representing a second multiplicity of activities associated with the second multiplicity of UEs,
wherein the second activity among the second multiplicity of activities includes a second content provided to a second UE among the second multiplicity of UEs,
wherein the second low-level information includes at least two of: a name of a user associated with a UE, a date associated with a first activity, a time associated with the first activity, a channel associated with the first activity, program associated with the first activity, a geographic location associated with the UE, a type of the UE, and a duration of the first activity;
obtain the correspondence between the second multiplicity of activities and the second low-level information,
wherein the correspondence maps the second content to a subset of second low-level information;
cluster the subset of second low-level information into the cluster among the multiple clusters; and
determine that a subset of the first low-level information belonging to the cluster indicates consumption of the second content.

19. The system of claim of claim 14, comprising instructions to:
determine a value of an attribute associated with the cluster among the multiple clusters;
determine a third cluster among the multiple clusters, wherein the value of the attribute associated with the third cluster satisfies a predetermined criterion,
wherein the third cluster is associated with a third multiplicity of UEs;
determine a third activity associated with the third cluster; and
provide an incentive to engage in the third activity to a third UE in the third multiplicity of UEs.

20. The system of claim of claim 14, comprising instructions to:
obtain the first low-level information representing the first multiplicity of activities associated with a provider of connectivity to a UE,
obtain the second low-level information representing the second multiplicity of activities associated with the second multiplicity of UEs,
wherein the second activity among the second multiplicity of activities includes a failure associated with the provider of connectivity to the UE;
obtain the correspondence between the second multiplicity of activities and the second low-level information,
wherein the correspondence maps the failure associated with the provider of connectivity to the UE to a subset of second low-level information;
cluster the subset of second low-level information into the cluster among the multiple clusters; and
determine that a subset of the first low-level information belonging to the cluster indicates the failure associated with the provider of connectivity to the UE.

* * * * *